(12) United States Patent
Takayama et al.

(10) Patent No.: US 7,245,784 B2
(45) Date of Patent: Jul. 17, 2007

(54) IMAGE PROCESSING FOR CORRECTING DEFECTS OF READ IMAGE

(75) Inventors: Tsutomu Takayama, Kanagawa (JP); Mitsugu Hanabusa, Tokyo (JP); Atsuko Kashiwazaki, Kanagawa (JP); Kengo Kinumura, Kanagawa (JP)

(73) Assignee: Canon Kabushiki Kaisha, Ohta-Ku, Tokyo (JP)

( * ) Notice: Subject to any disclaimer, the term of this patent is extended or adjusted under 35 U.S.C. 154(b) by 14 days.

(21) Appl. No.: 11/197,709

(22) Filed: Aug. 3, 2005

(65) Prior Publication Data

US 2005/0275909 A1    Dec. 15, 2005

Related U.S. Application Data

(63) Continuation of application No. 10/098,904, filed on Mar. 13, 2002, now Pat. No. 7,006,705.

(30) Foreign Application Priority Data

Mar. 15, 2001 (JP) .............................. 2001/074324
Mar. 15, 2001 (JP) .............................. 2001/074325
Mar. 15, 2001 (JP) .............................. 2001/074330

(51) Int. Cl.
*G06K 9/40* (2006.01)
*H04N 1/38* (2006.01)

(52) U.S. Cl. ...................... 382/275; 358/463

(58) Field of Classification Search ................ 382/141, 382/255, 274–275, 298, 321, 112, 305; 250/201.2, 250/559.05, 338.1, 559.02; 358/451, 463, 358/1.2, 505, 512
See application file for complete search history.

(56) References Cited

U.S. PATENT DOCUMENTS

| 4,933,983 | A | * | 6/1990 | Hiramatsu et al. | ......... 382/112 |
| 5,969,372 | A |   | 10/1999 | Stavely et al. | ......... 250/559.42 |
| 6,094,281 | A | * | 7/2000 | Nakai et al. | ............... 358/512 |
| 6,323,967 | B1 |   | 11/2001 | Fujinawa | |
| 6,493,061 | B1 |   | 12/2002 | Arita et al. | |
| 6,753,984 | B1 |   | 6/2004 | Wada | |
| 6,826,359 | B1 | * | 11/2004 | Takeda | ........................ 396/18 |
| 7,113,619 | B1 | * | 9/2006 | Matama | ...................... 382/112 |

FOREIGN PATENT DOCUMENTS

DE     44 38 746 A1    5/1995

(Continued)

OTHER PUBLICATIONS

European Search Report, Jun. 3, 2002.

*Primary Examiner*—Kanjibhai Patel
(74) *Attorney, Agent, or Firm*—Morgan & Finnegan, LLP

(57) ABSTRACT

An image reading apparatus having a visible light source for emitting visible light, an invisible light source for emitting invisible light, an imaging optical system for irradiating a document by these light sources to form optical images of the document, and a CCD for photoelectrically converting the optical images of the document turns on the visible light source to acquire a visible light image signal by the CCD. Then, the apparatus turns on the invisible light source to acquire an invisible light image signal by the CCD. After the invisible light image signal is acquired, the apparatus turns off the invisible light source, and turns on the visible light source regardless of whether to read the document.

17 Claims, 31 Drawing Sheets

| | FOREIGN PATENT DOCUMENTS | | |
|---|---|---|---|
| EP | 0 597 696 A2 | 5/1994 | |
| EP | 0 606 654 A2 | 7/1994 | |
| EP | 0 893 914 A2 | 1/1999 | |
| EP | 1 032 192 A2 | 8/2000 | |
| JP | 2000-115462 | 4/2000 | |
| JP | 2000-270221 | 9/2000 | |
| JP | 2001-36811 | 2/2001 | |
| JP | 2000-22919 | 8/2001 | |
| JP | 2000-33919 | 8/2001 | |
| JP | 2000-182905 | 3/2002 | |
| JP | 2001-82905 | 3/2002 | |
| WO | 98/34397 | 8/1998 | |
| WO | 99/40729 | 8/1999 | |

* cited by examiner

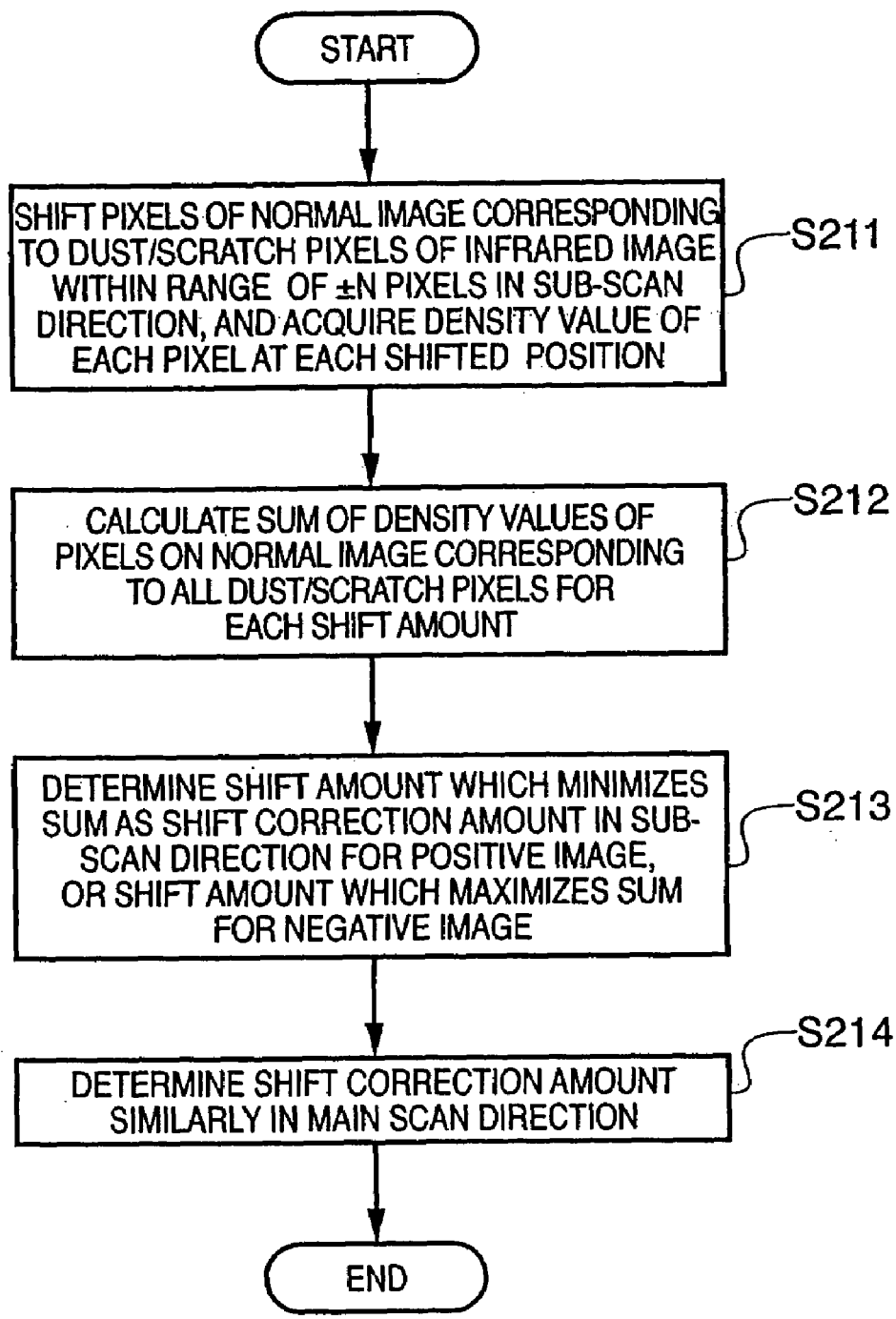

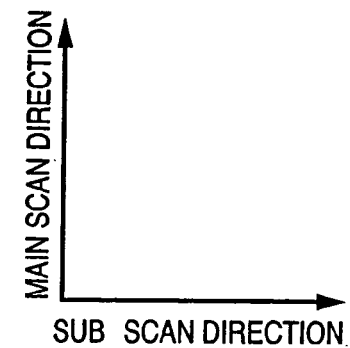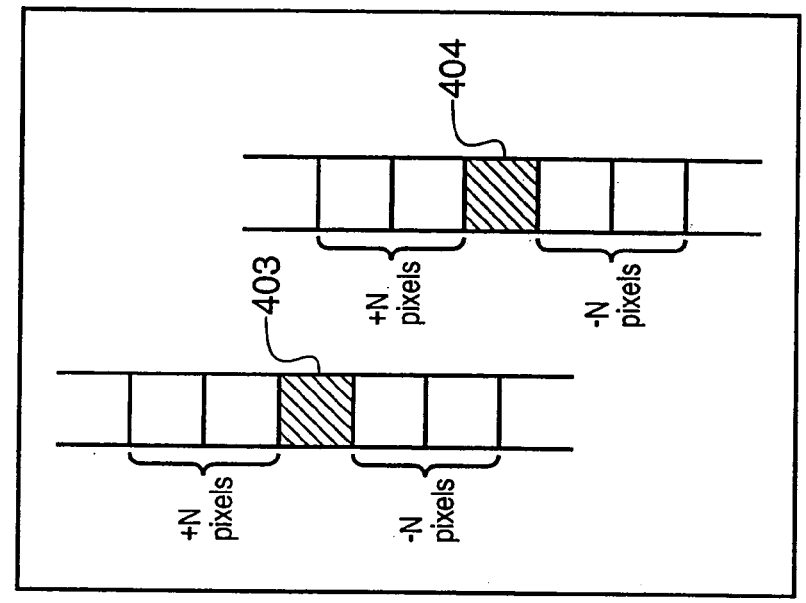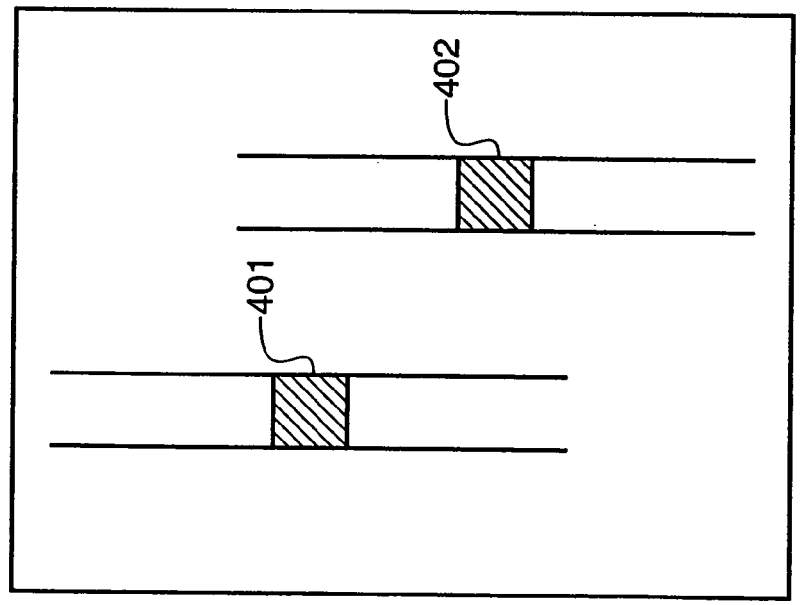

FIG. 10A

| SHIFT AMOUNT | PIXEL(1) | PIXEL(2) | PIXEL(3),(4)··· | SUM |
|---|---|---|---|---|
| +10 | 51 | 100 | | 4125 |
| +9 | 49 | 77 | | 3984 |
| ··· | ········ | ········ | | ········ |
| +2 | 23 | 20 | | 1382 |
| +1 | 20 | 23 | | (1323) ← MINIMUM VALUE |
| 0 | 12 | 23 | ········ | 1414 |
| −1 | 8 | 29 | | 1552 |
| −2 | 14 | 30 | | 1537 |
| ··· | ········ | ········ | | ········ |
| −9 | 53 | 53 | | 2872 |
| −10 | 55 | 60 | | 2618 |

FIG. 10B

| SHIFT AMOUNT | PIXEL(1) | PIXEL(3) | PIXEL(5),(7)··· | SUM |
|---|---|---|---|---|
| +10 | 51 | 48 | | 2082 |
| +9 | 49 | 45 | | 1953 |
| ··· | ········ | ········ | | ········ |
| +2 | 23 | 18 | | 664 |
| +1 | 20 | 20 | | (658) ← MINIMUM VALUE |
| 0 | 12 | 20 | ········ | 702 |
| −1 | 8 | 23 | | 738 |
| −2 | 14 | 25 | | 780 |
| ··· | ········ | ········ | | ········ |
| −9 | 53 | 43 | | 1452 |
| −10 | 55 | 55 | | 1560 |

FIG. 10C

| SHIFT AMOUNT | PIXEL(1) | PIXEL(3) | PIXEL(5),(7)··· | SUM |
|---|---|---|---|---|
| +10 | 51 | 48 | | 2082 |
| ··· | ········ | ········ | | ········ |
| +4 | 25 | 22 | | 683 |
| +2 | 23 | 18 | ········ | (664) ← MINIMUM VALUE |
| 0 | 12 | 20 | | 702 |
| −2 | 14 | 25 | | 780 |
| ··· | ········ | ········ | | ········ |
| −10 | 55 | 55 | | 1560 |

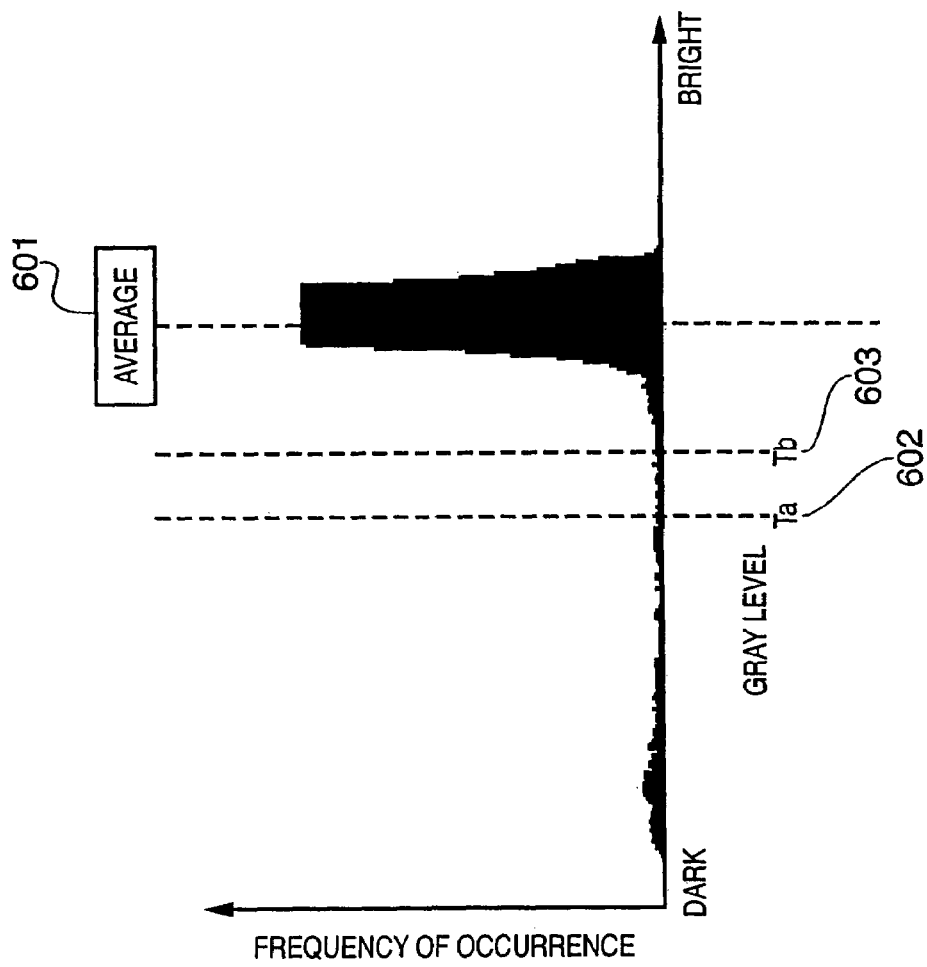

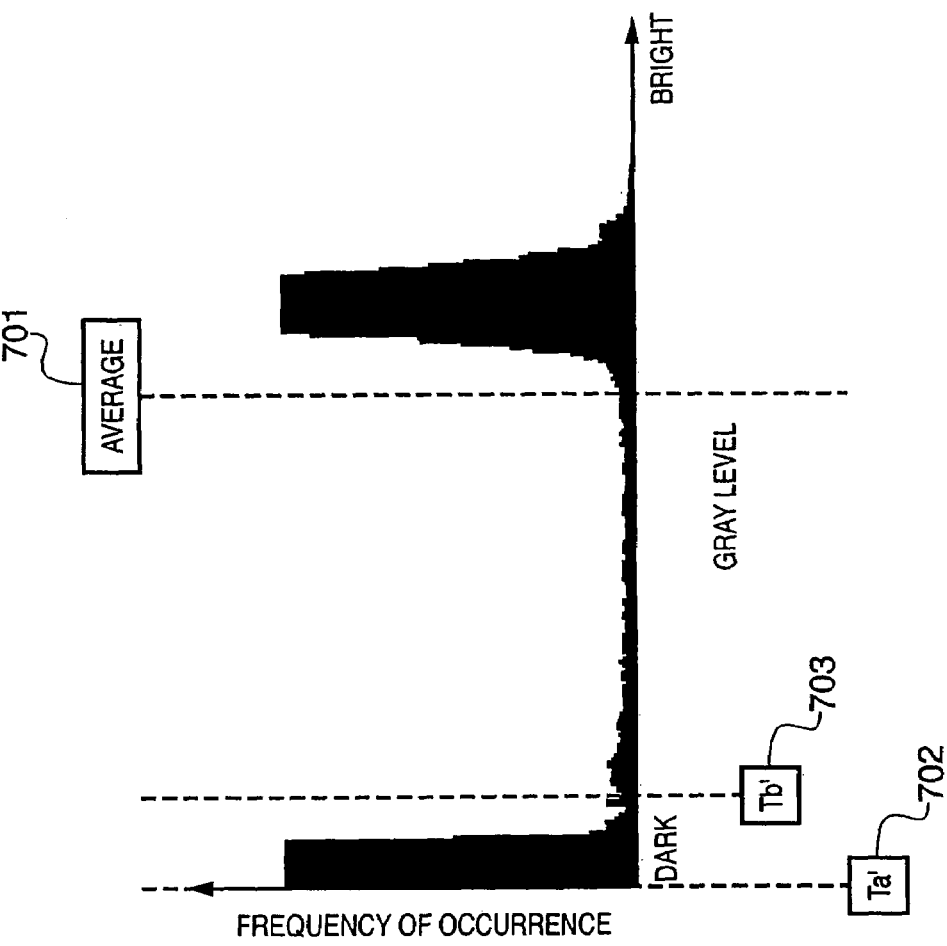

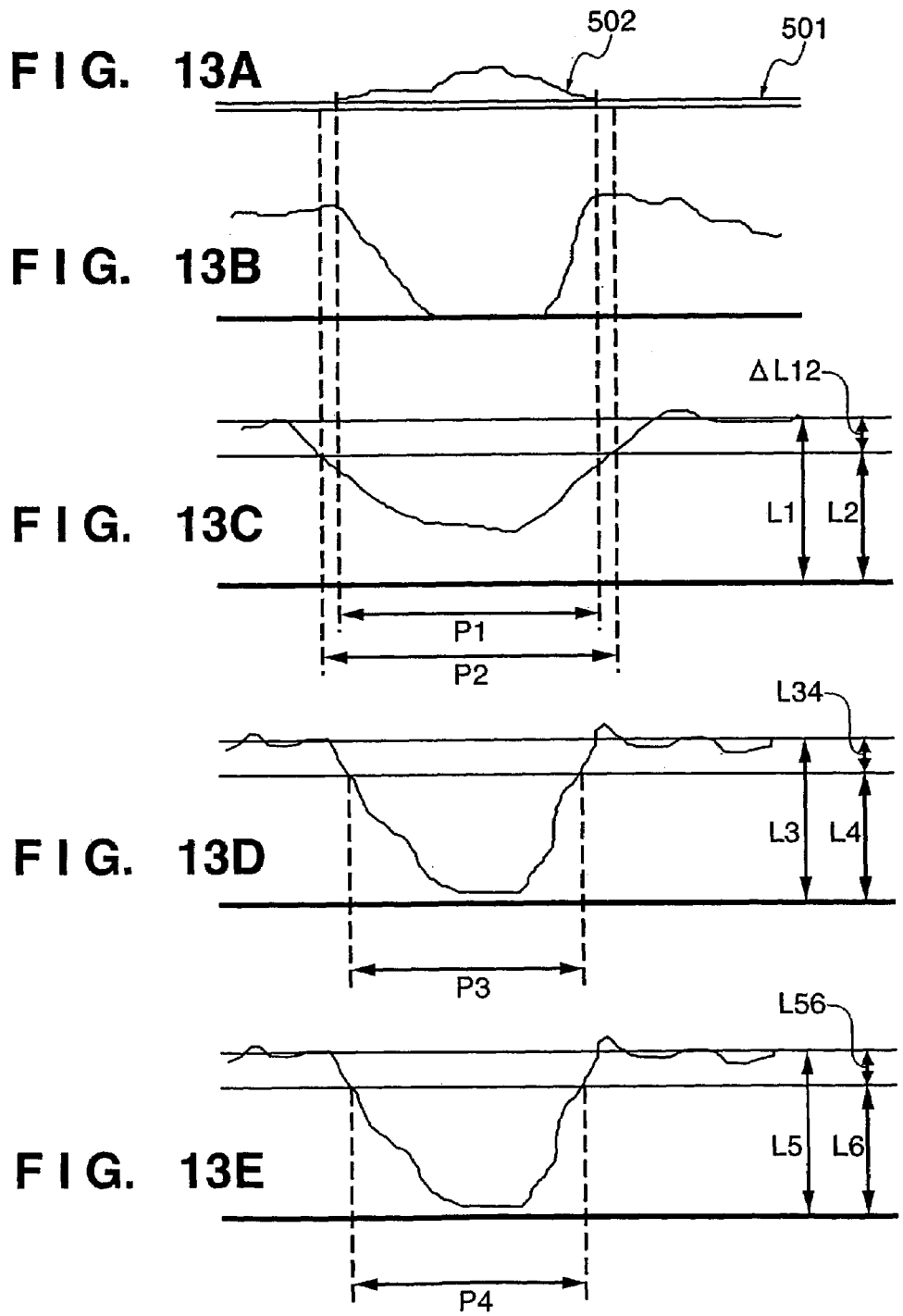

PIXEL FREE FROM DUST/SCRATCH

PIXEL INFLUENCED BY DUST/SCRATCH

DUST/SCRATCH-DETECTED PIXEL

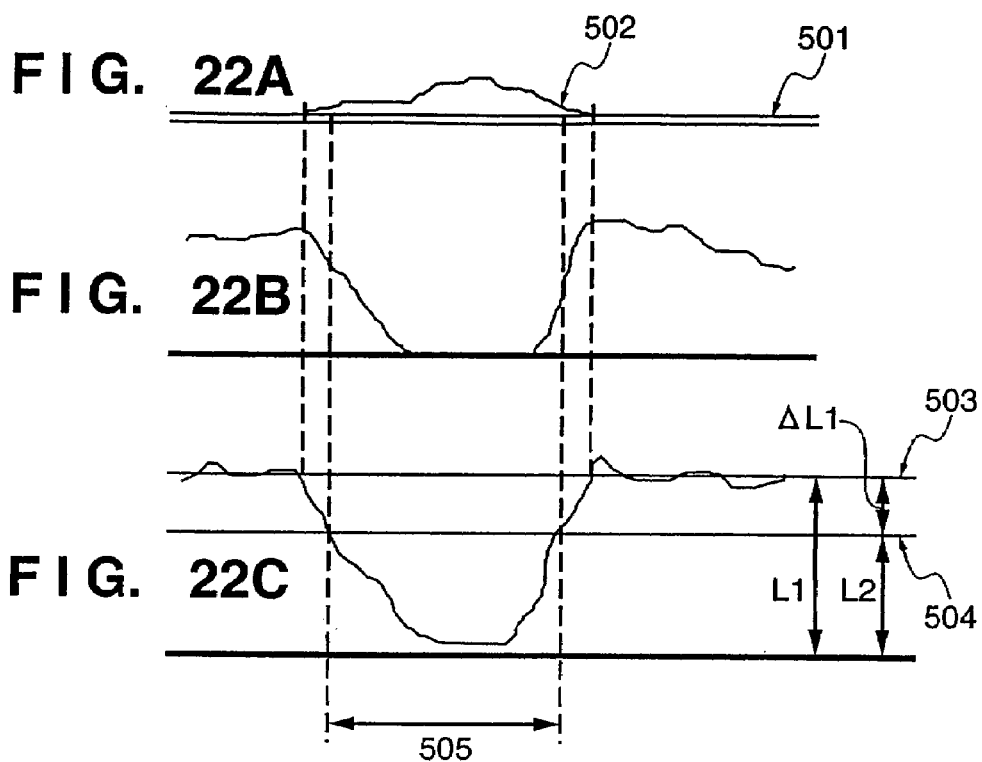
FIG. 22A
FIG. 22B
FIG. 22C
FIG. 22D
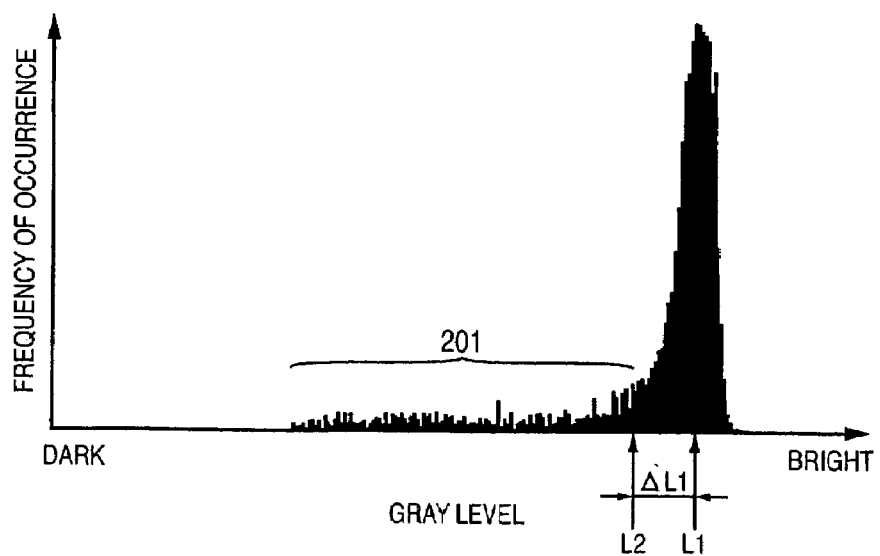

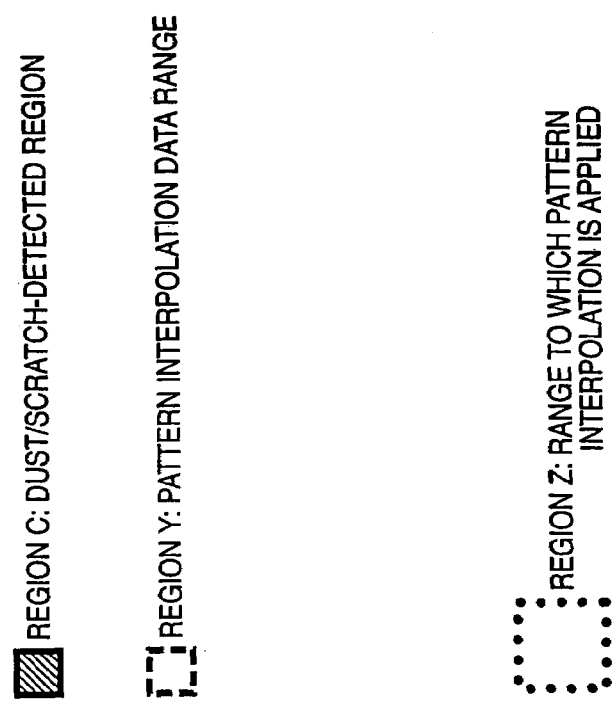
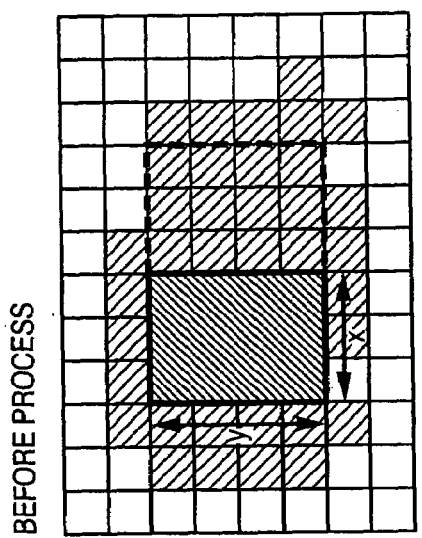
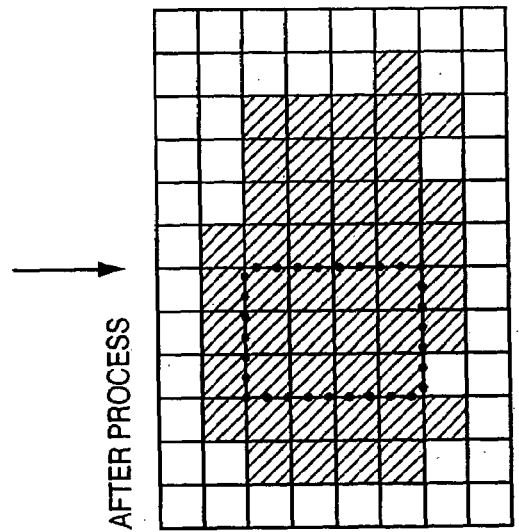
FIG. 24A  BEFORE PROCESS
FIG. 24B  AFTER PROCESS --Prior Art--

--Prior Art--

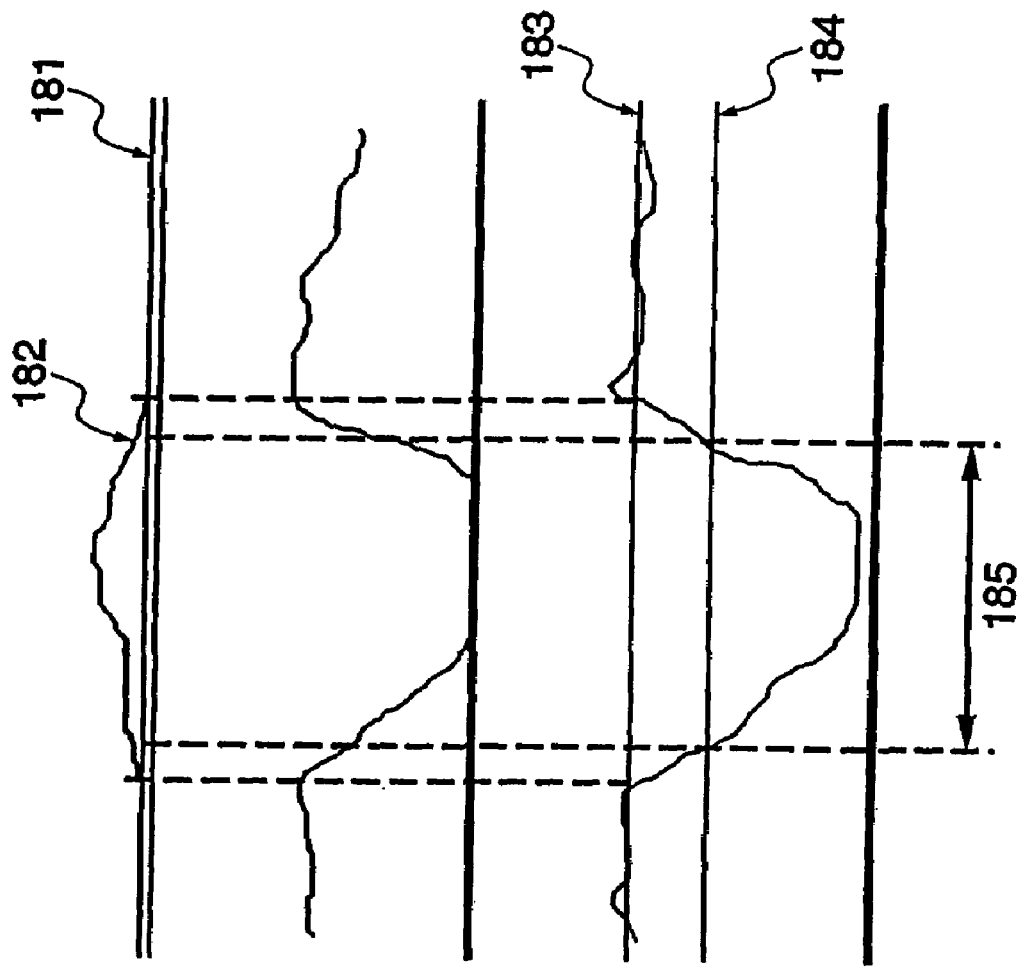

IMAGE PROCESSING FOR CORRECTING DEFECTS OF READ IMAGE

This is continuation of application Ser. No. 10/098,904, filed Mar. 13, 2002 now U.S. Pat. No. 7,006,705.

FIELD OF THE INVENTION

The present invention relates to an image processing method, image processing apparatus, and image reading apparatus and, more particularly, to an image processing method, image processing apparatus, and image reading apparatus for correcting any defects of a read transparent document due to dust, scratches, and the like.

BACKGROUND OF THE INVENTION

FIG. 25 shows a schematic arrangement in a conventional transparent document image reading apparatus. Referring to FIG. 25, a transparent document 142 such as a positive film, negative film, or the like placed on a platen glass 141 is illuminated with light emitted by a transparent document illumination lamp 144 via a diffusion plate 143 set above the document, and light transmitted through the transparent document 142 is guided to a CCD 150 via a mirror 147, inverted-V mirrors 148, and imaging lens 149. The light is converted by the CCD 150 on which a large number of solid-state image sensing elements line up into an electrical signal, thus obtaining an image signal in the main scan direction.

In this case, image reading in the sub-scan direction is done by mechanically moving the transparent document illumination lamp 144 and mirror 147 in the sub-scan direction with respect to the transparent document 142 while maintaining an identical velocity and phase, and making the inverted-V mirrors 148 track at the half scan velocity in the sub-scan direction so as to maintain a constant optical path length (conjugate relationship) from the transparent document 142 to the CCD 150. In this way, a two-dimensional image is read in combination with the process in the main scan direction.

The aforementioned transparent document image reading apparatus can read a so-called reflecting document which is described on an opaque material and is illuminated with light so as to process the light reflected by the material. In this case, a reflecting document is placed in place of the transparent document 142, and is illuminated with a direct light beam emitted by a reflecting document illumination lamp 145, which is turned on in place of the transparent document illumination lamp 144, and with a light beam reflected by a reflector 146. The light reflected by the reflecting document is read by the CCD 150, thus forming an image in the main scan direction as in the transparent document.

Especially, as a color reading method, a 3-line color image reading method is prevalent. That is, the reflecting document illumination lamp 145 uses a lamp having white spectral characteristics, and the CCD 150 uses a 3-line type CCD having R, G, and B color filters. Three colors (R, G, and B) of image information are simultaneously read by a single scan, and R, G, and B color signals on an identical line are superposed by an image processing circuit, thus forming a color image.

In order to correct any defects of an image due to dust, scratches, and the like on a transparent document in the aforementioned transparent document image reading apparatus, the only effective method is to retouch them using image edit software after the image is read. For this reason, a very long time is required to correct such defects.

In recent years, as such transparent document image reading apparatus, an image reading apparatus having a so-called dust/scratch reduction function of detecting dust present on a transparent document and scratches on a film surface (such detection will be referred to as "dust/scratch detection" hereinafter), and reducing the influences of such dust and scratches by an image process has been developed.

FIG. 26 shows a conventional image reading apparatus 1 having a dust/scratch detection function. The same reference numerals in FIG. 26 denote the same parts as in FIG. 25, and a detailed description thereof will be omitted.

Referring to FIG. 26, reference numeral 151 denotes an infrared lamp which comprises an LED having an emission intensity peak at a wavelength of about 880 nm.

FIG. 27 is a block diagram showing the functional arrangement of a dust/scratch reducer 2 for implementing dust/scratch reduction using image data obtained by the image reading apparatus 1. Referring to FIG. 27, reference numeral 21 denotes an interface (I/F) for inputting image data read by the image reading apparatus 1; 22, an image memory for storing an image read using the transparent document illumination lamp 144 or reflecting document illumination lamp 145 (to be referred to as a "normal image" hereinafter); 23, an infrared image memory for storing an image read using the infrared lamp 151 (to be referred to as an "infrared image" hereinafter); 24, a threshold value holding unit for holding a predetermined threshold value; 25, a dust/scratch detection unit; and 26, a dust/scratch correction unit.

FIG. 28 shows the spectral intensity distributions of the transparent document illumination lamp 144 and infrared lamp 151, and the characteristics of these lamps are represented by the solid and dot-dash-curves, respectively. FIG. 29 shows the spectral transmittance characteristics of cyan, yellow, and magenta dyes of a general negative/positive film, and the peak wavelength (about 880 nm) of the spectral intensity distribution of the infrared lamp 151. As is apparent from FIG. 29, most light components emitted by the infrared lamp are transmitted through a general color film irrespective of an image on the film since all dyes have very high transmittance at about 880 nm.

The transparent document reading operation including dust/scratch reduction will be explained in detail below with reference to the flow chart shown in FIG. 30.

In step S10, the reflecting document illumination lamp 145 and infrared lamp 151 in FIG. 26 are turned off, and the transparent document illumination lamp 144 is turned on. At this time, an illumination light beam emitted by the transparent document illumination lamp 144 is uniformly diffused by the diffusion plate 143, and that diffused light beam is transmitted through the transparent document 142. The transmitted light beam passes through the mirror 147, inverted-V mirrors 148, and imaging lens 149, and is projected onto the CCD 150. An image projected onto the CCD 150 is converted into an electrical signal, which is temporarily stored in the image memory 22 via the I/F 21 in FIG. 27. Note, if the transparent document is a negative film, the read negative image is inverted to a positive image and then stored in the image memory 22.

In step S20, the reflecting document illumination lamp 145 and transparent document illumination lamp 144 in FIG. 26 are turned off, and the infrared lamp 151 is turned on. An illumination light beam emitted by the infrared lamp 151 with the characteristics shown in FIG. 28 is uniformly diffused by the diffusion plate 143. The diffused light beam is transmitted through the transparent document 142, and passes through the mirror 147, inverted-V mirrors 148, and imaging lens 149. The light is then projected onto the CCD 150. Hence, the illumination light beam emitted by the infrared lamp 151 is transmitted through the transparent document 142 irrespective of an image (exposure) of the transparent document 142 such as a negative film, positive film, or the like, as shown in FIG. 29, and an image of dust, scratch, or like, which physically intercepts the optical path, is projected onto the CCD 150 as a shadow. The infrared image projected onto the CCD 150 is converted into the electrical signal, which is temporarily stored in the infrared image memory 23 via the I/F 21 in FIG. 27.

In step S30 and subsequent steps, dust/scratch detection and correction are executed. The principle of dust/scratch detection will be described in detail below.

FIGS. 31A to 31C illustrate the relationship between dust or the like, and the gray levels of images read using the transparent document illumination lamp 144 and infrared lamp 151, which are plotted in the main scan direction. In FIG. 31A, reference numeral 181 denotes a positive film; and 182, dust on the positive film 181. FIG. 31B shows the gray level obtained when a corresponding portion in FIG. 31A is read using the transparent document illumination lamp 144. The gray level assumes a lower value as an image becomes darker. The gray level of the dust portion 182 is low irrespective of an image on the positive film. FIG. 31C shows the gray level obtained when the portion in FIG. 31A is read using the infrared lamp 151. The dust portion 182 has low gray level since no infrared light is transmitted through there, and a portion other than the dust 182 has a nearly constant level 183 since infrared light is transmitted through there. Hence, a threshold value 184 is set at a gray level lower than the level 183, and a defect region 185 formed by dust can be detected by extracting a portion having a gray level equal to or lower than the threshold value 184.

The threshold value 184 is held in advance in the threshold value holding unit 24. Therefore, the dust/scratch detection unit 25 reads out this threshold value 184 from the threshold value holding unit 24, and compares it with infrared image data in turn in step S30, thus detecting the defect region 185.

If the infrared image data is smaller than the threshold value 184 (NO in step S30), the influence of dust 182 is eliminated by executing, e.g., an interpolation process of the defect region 185 based on a normal region around it in step S40. The comparison process is executed for all infrared image data, and when any defect region is detected, the corresponding normal image data undergoes interpolation (step S50).

However, no prior art fully examines the ON/OFF sequences of a visible light source and an invisible light source such as an infrared source. A rise sequence has not been optimized for a combination between a visible light source which requires a relatively long rise time and an invisible light source which requires a relatively short rise time. The position of a lens which corrects the difference in optical path length between visible and invisible light shifts toward the optical axis, complicating the structure. No extensive studies have been made for a sequence of reading a film using visible and invisible light, detecting dust and scratches on a film on the basis of the read image using the invisible light (referred to as "invisible light image", hereinafter), and correcting a portion of the read image using the visible light (referred to as "visible light image", hereinafter) corresponding to the detected dust and scratches. A stable, high-precision dust/scratch reduction function is difficult to supply.

To detect dust and scratches based on an invisible light image, a single document must be read twice using invisible light and visible light. The document must be scanned by a scanning unit including at least some of a photoelectric converter, optical system, and processing circuit. This generates a shift due to a poor operation precision of the scanning unit between an image obtained by invisible light scan reading for detecting dust and scratches and an image obtained by visible light scan reading for acquiring actual image information. As a result, dust and scratches cannot be satisfactorily reduced.

Further, an invisible light image may be influenced by the shadow of a film holder. More specifically, a shadow portion of a visible light image that is not a defect by dust or a scratch may be erroneously corrected.

Furthermore, a document read at a high designated resolution provides large image data, which requires a very long time to detect the positions of dust and scratches on visible light and invisible light images.

Further, only a uniform setting of whether to perform dust/scratch reduction cannot achieve a process suitable for an individual film. In general, a scratch portion is higher in infrared transmittance than a dust portion. It is therefore difficult to set parameters for properly processing both scratches and dust. If a dust/scratch portion is to be interpolated by neighboring data within a range much larger than the dust/scratch portion so as to completely correct the dust/scratch portion, detailed data within the range other than the dust/scratch is undesirably lost, making the image look unnatural. In addition, the dust/scratch reduction range to be corrected should vary depending upon the resolution and is difficult to set the range to a detected dust/scratch portion plus a specific number of pixels surrounding the dust/scratch portion.

SUMMARY OF THE INVENTION

The present invention has been made in consideration of the above situation, and has as its object to optimize a rise sequence for visible and invisible light sources.

It is another object of the present invention to correct the difference in optical path length between visible and invisible light images with a simple structure using an optical member.

It is still another object of the present invention to supply a stable, high-precision dust/scratch reduction function.

It is still another object of the present invention to stably perform appropriate dust/scratch detection and correction even if a shift occurs between images obtained by a plurality of scanning operations when a document is read to achieve dust/scratch correction.

It is still another object of the present invention to reduce the influence of a shift from an ideal wavelength characteristic, the influence of the shadow of a film holder, and the like.

It is still another object of the present invention to achieve a high-speed dust/scratch reduction process without decreasing a dust/scratch reduction effect.

It is still another object of the present invention to enable changing the dust/scratch detection sensitivity in accordance with a document or user purpose.

According to the present invention, the foregoing objects are attained by providing a control method for an image reading apparatus having a visible light source that emits visible light, an invisible light source that emits invisible light, an imaging optical system adapted to irradiate a document by these light sources to form optical images of the document, and a photoelectric converter adapted to photoelectrically convert the optical images of the document, comprising: turning on the visible light source to acquire a visible light image signal by the photoelectric converter; turning on the invisible light source to acquire an invisible light image signal by the photoelectric converter; and turning off the invisible light source after the invisible light image signal is acquired, and turning on the visible light source regardless of whether to read the document.

According to the present invention, the foregoing objects are also attained by providing an image processing method of processing first and second image signals obtained by an image reading apparatus having a first light source that emits light within a first wavelength range, a second light source that emits light within a second wavelength range, an imaging optical system adapted to irradiate a document by these light sources to form optical images of the document, a photoelectric converter adapted to photoelectrically convert the optical images of the document, and an optical path length correction member adapted to correct a difference in imaging position between first image obtained by the photoelectric converter by turning on the first light source and a second image obtained by the photoelectric converter by turning on the second light source, comprising correcting magnifications of the first and second images after the first image signal is acquired.

Further, the foregoing objects are also attained by providing an image reading apparatus having a visible light source that emits visible light, an invisible light source that emits invisible light, an imaging optical system for irradiating a document by these light sources to form optical images of the document, and a photoelectric converter for photoelectrically converting the optical images of the document, comprising a controller adapted to turn on the invisible light source to acquire an invisible light image by the photoelectric converter, then turn off the invisible light source, and turn on the visible light source regardless of whether to read the document.

Furthermore, the foregoing objects are also attained by providing an image processing apparatus having a first light source that emits light within a first wavelength range, a second light source that emits light within a second wavelength range, an imaging optical system adapted to irradiate a document by these light sources to form optical images of the document, a photoelectric converter adapted to photoelectrically convert the optical images of the document, and an optical path length correction member adapted to correct a difference in imaging position between first image obtained by the photoelectric converter by turning on the first light source and a second image obtained by the photoelectric converter by turning on the second light source, comprising a magnification correction unit adapted to make image magnifications of first and second images coincide with each other.

Further, the foregoing objects are also attained by providing an image processing method of irradiating a document by a visible light source that emits visible light and an invisible light source that emits invisible light, and processing visible and invisible light image signals obtained by photoelectrically converting optical images of the document, comprising: generating a first dust/scratch image signal from the invisible light image signal by using a first threshold value; calculating a correlation between the visible light image signal and the first dust/scratch image signal; and changing a method of calculating the correlation in accordance with whether the document is a negative or positive image.

Further, the foregoing objects are also attained by providing an image processing method of irradiating a document by a visible light source that emits visible light and an invisible light source that emits invisible light, and processing visible and invisible light image signals obtained by photoelectrically converting optical images of the document, comprising: generating a first dust/scratch image signal from the invisible light image signal by using a first threshold value; generating a second dust/scratch image signal from the invisible light image signal by using a second threshold value; and correcting the visible light image signal by using the visible light image signal and the first and second dust/scratch image signals.

Further, the foregoing objects are also attained by providing an image processing method which has light sources that selectively emit visible light or invisible light, and processes a visible light image signal obtained by photoelectrically converting an optical image of a document irradiated by the light source, and an invisible light image signal different in resolution from the visible light image signal, comprising generating a first dust/scratch image signal from the invisible light image signal by using a first threshold value; detecting a positional shift amount between visible and invisible light images after the resolution of the visible light image signal and a resolution of the first dust/scratch image signal are made to coincide with each other; and correcting the visible light image signal by using the shift amount and the invisible light image signal.

Further, the foregoing objects are also attained by providing an image reading apparatus comprising: a visible light source that emits visible light; an invisible light source that emits invisible light; a photoelectric converter adapted to photoelectrically convert optical images of a document irradiated by the visible light source and the invisible light source; and a signal processor adapted to process a visible light image signal obtained by the photoelectric converter by irradiating the document by the visible light source, and an invisible light image signal obtained by the photoelectric converter by irradiating the document by the invisible light source, wherein the signal processor generates a first dust/scratch image signal from the invisible light image signal by using a first threshold value, calculates a correlation between the visible light image signal and the first dust/scratch image signal, and changes a method of calculating the correlation in accordance with whether the document is a negative or positive image.

Further, the foregoing objects are also attained by providing an image reading apparatus comprising: a visible light source that emits visible light; an invisible light source that emits invisible light; a photoelectric converter adapted to photoelectrically convert optical images of a document irradiated by the visible light source and the invisible light source; a signal processor adapted to process a visible light image signal obtained by the photoelectric converter by irradiating the document by the visible light source, and an invisible light image signal obtained by the photoelectric converter by irradiating the document by the invisible light source, the signal processor generates a first dust/scratch image signal from the invisible light image signal by using a first threshold value, and generates a second dust/scratch image signal from the invisible light image signal by using a second threshold value; and a correction unit adapted to correct the visible light image signal by using the visible light image signal and the first and second dust/scratch image signals.

Further, the foregoing objects are also attained by providing an image reading apparatus comprising: a visible light source that emits visible light; a invisible light source that emits invisible light; a photoelectric converter adapted to photoelectrically convert optical images of a document irradiated by the visible light source and the invisible light source; a signal processor adapted to process a visible light image signal obtained by the photoelectric converter by irradiating the document by the visible light source, and an invisible light image signal obtained by the photoelectric converter by irradiating the document by the invisible light source, the signal processor generates a first dust/scratch image signal from the invisible light image signal by using a first threshold value, makes resolutions of the visible light image signal and the first dust/scratch image signal coincide with each other, and then detects a positional shift amount between visible and invisible light images; and a correction unit adapted to correct the visible light image signal by using the shift amount and the invisible light image signal.

Further, the foregoing objects are also attained by providing an image processing apparatus for irradiating a document by a visible light source that emits visible light and an invisible light source that emits invisible light, and processing visible and invisible light image signals obtained by photoelectrically converting optical images of the document, thereby correcting the visible light image signal, comprising a setting unit for variably setting a sensitivity of correction.

Further, the foregoing objects are also attained by providing an image processing method including processing a visible light image signal obtained by photoelectrically converting an optical image of a document irradiated by a visible light source and an invisible light image signal obtained by photoelectrically converting an optical image of a document irradiated by an invisible light source, comprising variably setting a sensitivity of correction.

Further, the foregoing objects are also attained by providing an image reading system for irradiating a document by a visible light source that emits visible light and an invisible light source that emits invisible light, and processing visible and invisible light image signals obtained by photoelectrically converting optical images of the document, thereby correcting the visible light image signal, comprising a setting unit adapted to variably set a sensitivity of correction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flow chart showing a process in a positional shift amount detection unit according to the second embodiment of the present invention;

FIGS. 9A and 9B are views for explaining detection of the positional shift amount according to the second embodiment of the present invention;

FIGS. 10A to 10C are views showing examples of positional shift detection calculation in the positional shift amount detection unit according to the second embodiment of the present invention;

FIG. 11 is a view showing setting of two threshold values in a threshold value determination/holding unit according to the second embodiment of the present invention;

FIG. 12 is a view showing a histogram and setting of a threshold value in the threshold value determination/holding unit according to the second embodiment of the present invention when a holder shadow is reflected;

FIGS. 13A to 13E are schematic views for explaining a third embodiment of the present invention;

FIGS. 22A to 22D are views showing the gray levels of images read by a transparent document illumination lamp and infrared lamp that are plotted in the main scan direction, and the histogram of an infrared image;

FIGS. 24A and 24B are views for explaining pattern interpolation according to an eighth embodiment of the present invention;

FIGS. 31A to 31C show the relationship between dust on a film and the gray levels obtained by reading a film using the transparent document illumination lamp and infrared lamp in the prior art.

DETAILED DESCRIPTION OF THE PREFERRED EMBODIMENTS

Preferred embodiments of the present invention will be described in detail in accordance with the accompanying drawings.

<First Embodiment>

Figure 1:
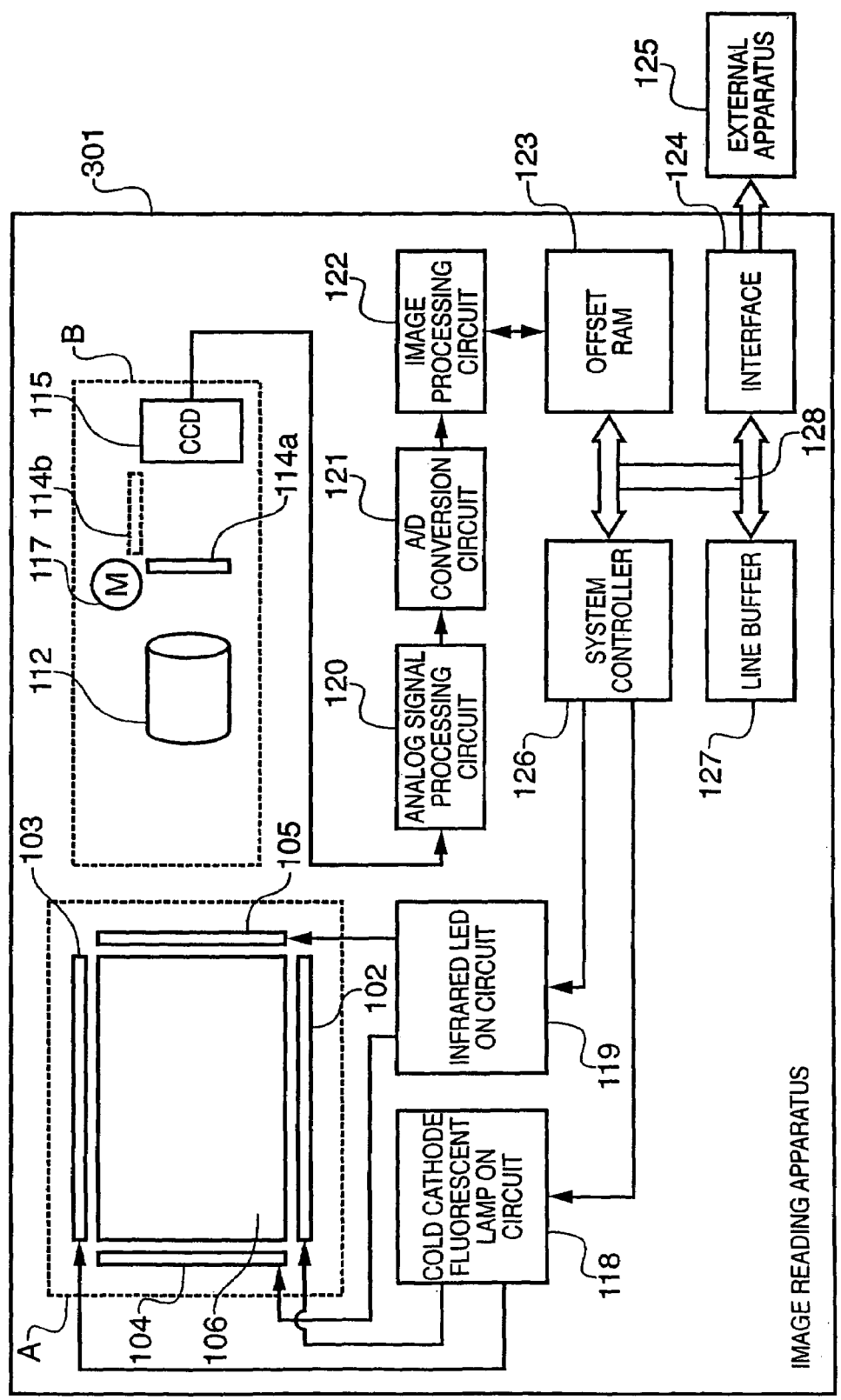
FIG. 1 is a block diagram showing the system configuration of an image reading apparatus according to a first embodiment of the present invention.
Figure 2:
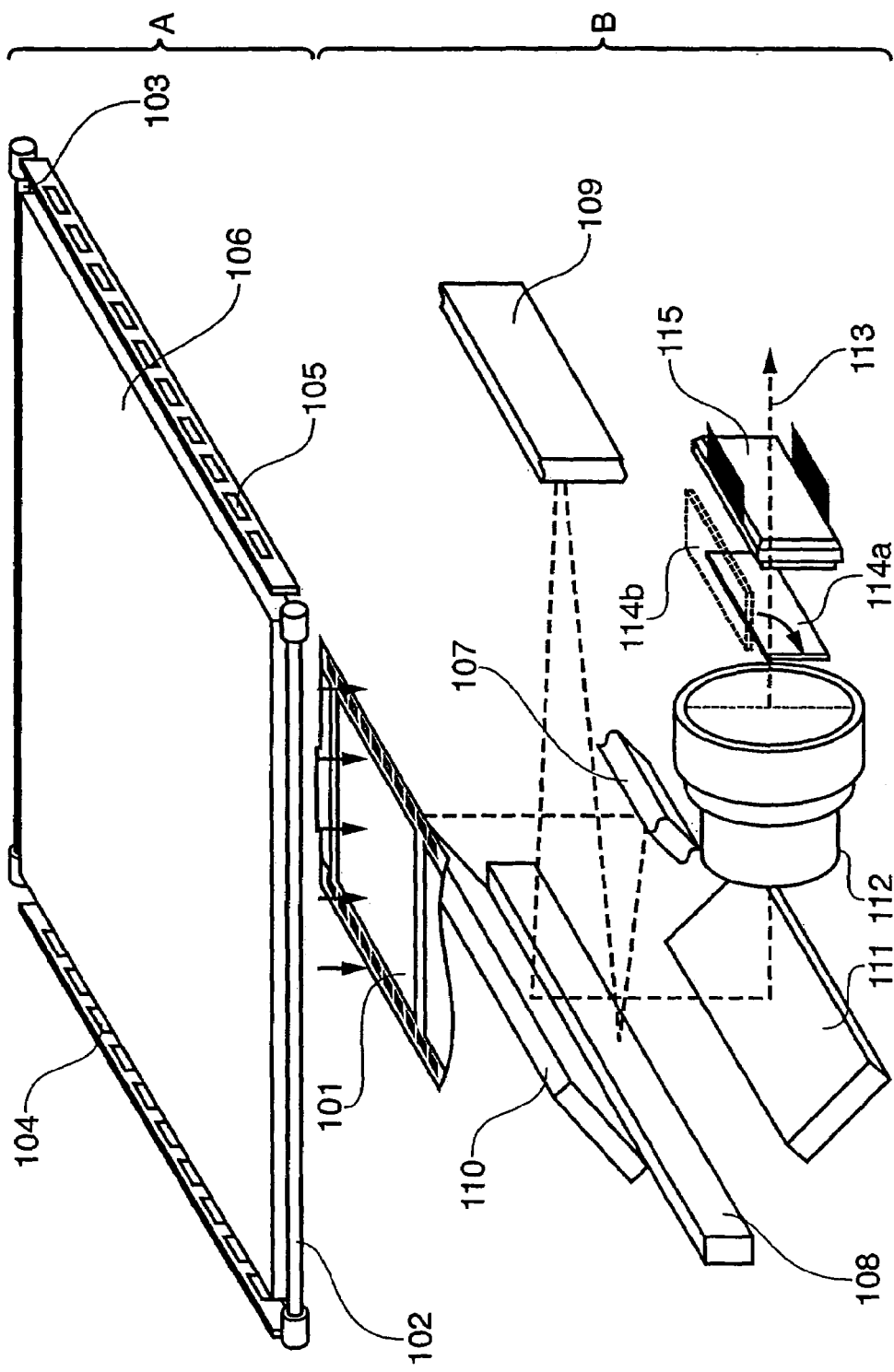
FIG. 2 is a perspective view showing the partial internal arrangement of the image reading apparatus according to the first embodiment of the present invention.

FIGS. 1 to 5 show the first embodiment of the present invention. FIG. 1 is a block diagram showing a system configuration having an image reading apparatus 301 according to the first embodiment. FIG. 2 is a perspective view showing the partial internal arrangement of the image reading apparatus 301 according to the first embodiment. In FIGS. 1 and 2, reference numeral 101 denotes a transparent document such as a film. Reference symbol A denotes a backlight source unit for illuminating the transparent document 101 with light. Reference numerals 102 and 103 denote cold cathode fluorescent lamps as visible light sources; 104 and 105, infrared LED arrays as infrared sources; and 106, a light guide for guiding light from each light source in a direction substantially normal to the transparent document 101.

Reference symbol B denotes an optical unit constituted on the scanner main body side; 107, 108, 109, 110, and 111, mirrors for reflecting light having passed through the transparent document 101 in predetermined directions; 112, an imaging lens for forming light having passed through the transparent document 101 into an optical image; 113, an optical axis extending through the center of the imaging lens; and 114, a glass plate for correcting the optical path length difference caused by the wavelength difference between visible light and infrared light. 114a shows a state wherein the glass plate 114 is placed so that the optical axis is substantially normal to the glass plate 114, and 114b shows a state wherein the glass plate 114 is rotated through almost 90° and retracted outside the optical path of an optical image; and 115, a linear image sensor constituted by arraying photoelectric converters for outputting an optical image formed by the imaging lens 112 as electrical R, G, and B image signals. In this embodiment, the linear image sensor 115 is a 3-line linear sensor having color filters of three, R, G, and B colors. As the photoelectric converter, a known photoelectric converter, such as of a CCD type and MOS type, may be used. Reference numeral 117 denotes a motor for pivoting the glass plate 114; 118, an ON circuit for the cold cathode fluorescent lamps 102 and 103; and 119, an ON circuit for the infrared LED arrays 104 and 105.

Reference numeral 120 denotes an analog processing circuit for processing R, G, and B image signals output from the CCD linear image sensor 115; 121, an A (Analog)/D (Digital) conversion circuit; and 122, an image processing circuit for performing a necessary image process in the image reading apparatus. The image process is not directly relevant to the present invention, and a detailed description thereof will be omitted. Reference numeral 123 denotes an offset RAM (Random Access Memory) used in the image processing circuit 122; 124, an interface; 125, an external apparatus such as a personal computer; 126, a system controller; 127, a line buffer; and 128, a CPU (Central Processing Unit) bus. The interface 124 makes an output image signal from the image processing circuit 122 stored in the line buffer 127, and outputted to the signal to the personal computer 125. As shown in FIG. 1, the system controller 126, line buffer 127, interface 124, and offset RAM 123 are connected by the CPU bus 128 made up of an address bus and data bus. This enables data communication between these circuits.

Figure 3:
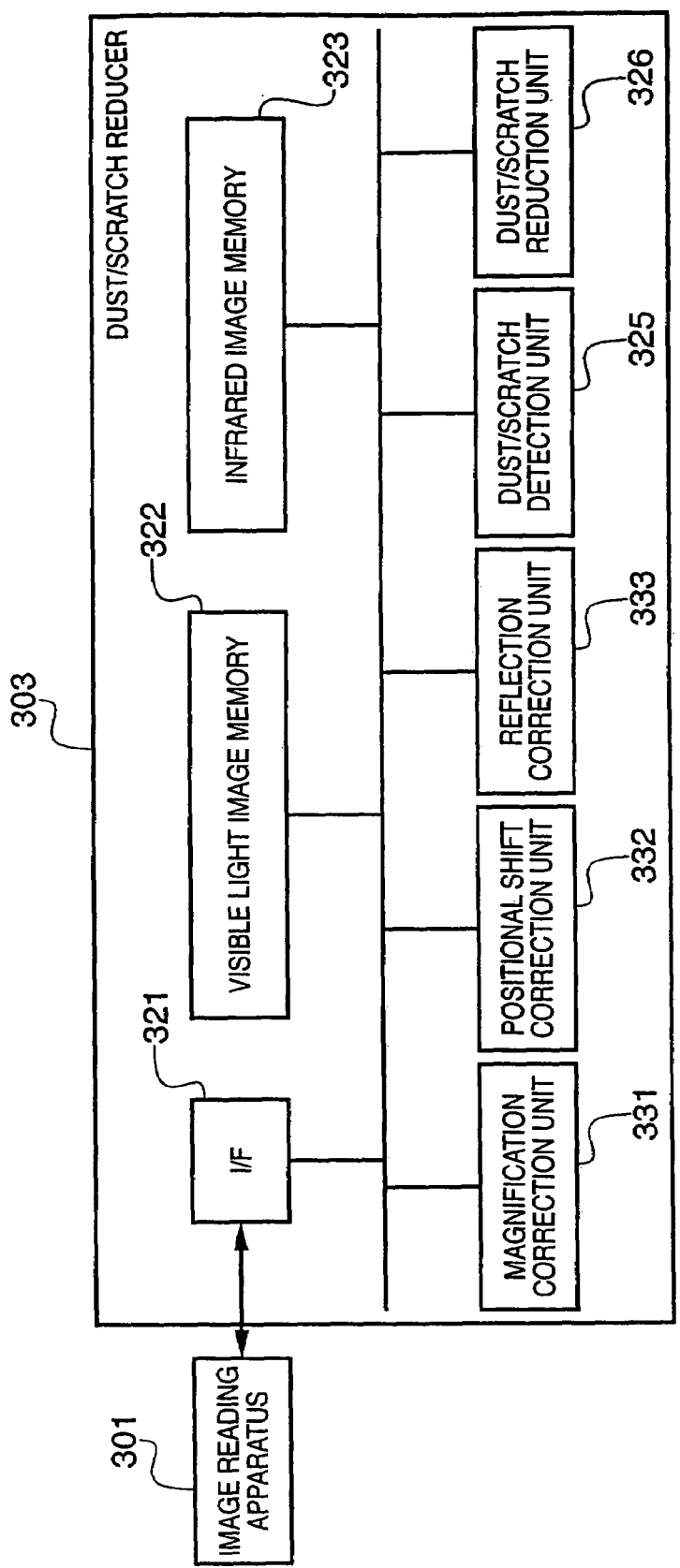
FIG. 3 is a block diagram showing the arrangement of a dust/scratch reducer according to the first embodiment of the present invention.

FIG. 3 is a block diagram showing the functional arrangement of a dust/scratch reducer 303 for performing dust/scratch reduction for an image signal output from the image reading apparatus 301 of the first embodiment in the personal computer 125. The dust/scratch reducer 303 in FIG. 3 may be incorporated in the image reading apparatus 301.

In FIG. 3, reference numeral 321 denotes an interface (I/F) for inputting image data obtained by reading a document by the image reading apparatus 301; 322, a visible light image memory for storing a visible light image obtained by reading a document by using the cold cathode fluorescent lamps 102 and 103; 323, an infrared image memory for storing an infrared image obtained by reading a document by using the infrared LED arrays 104 and 105; 325, a dust/scratch detection unit; 326, a dust/scratch reduction unit; 331, a magnification correction unit; 332, a positional shift correction unit; and 333, a reflection correction unit.

Figure 4:
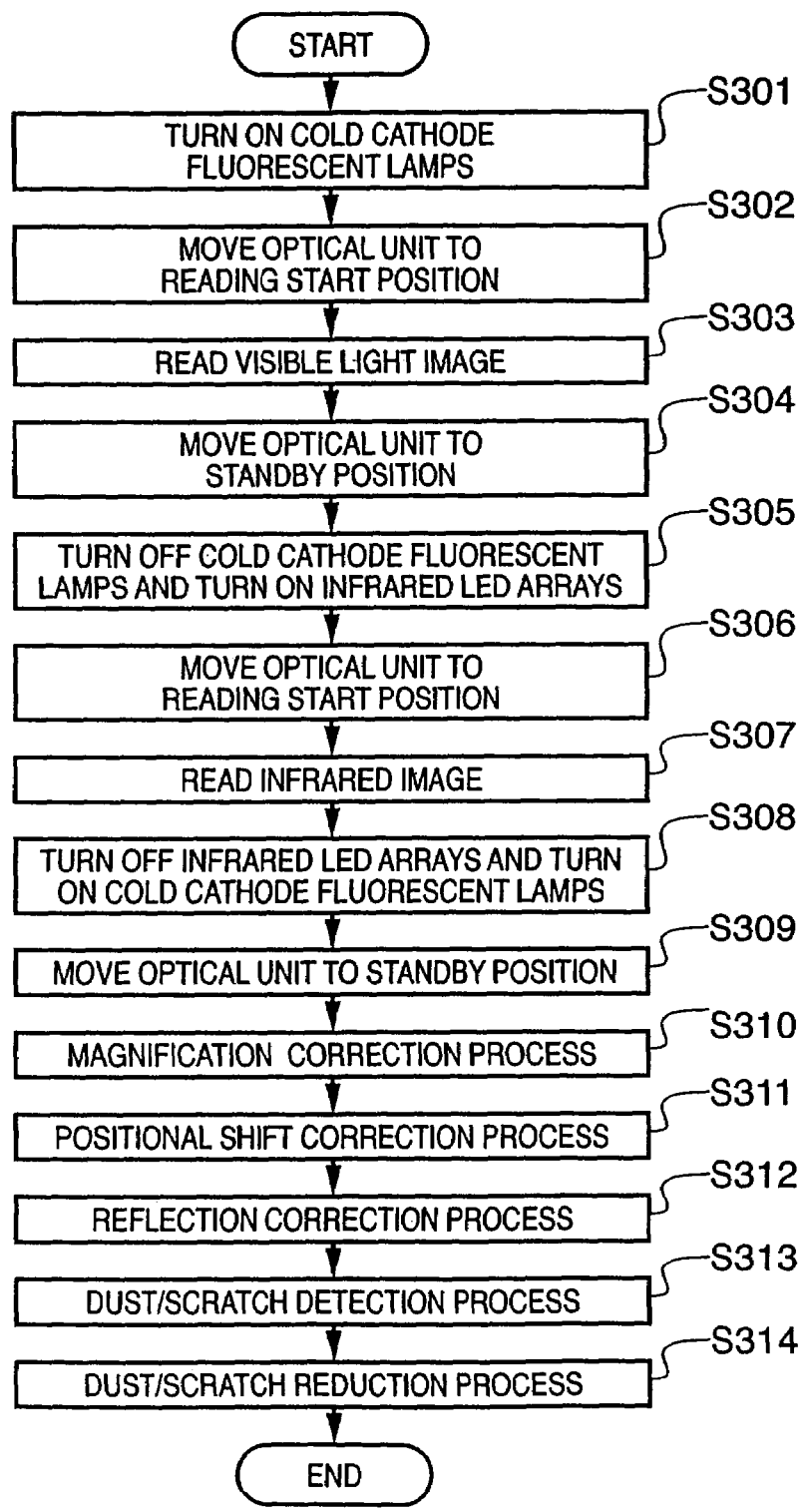
FIG. 4 is a flow chart showing an operation sequence according to the first embodiment of the present invention.

An operation sequence of reducing effects of dust and scratches on the transparent document 101 from the image of the transparent document 101 by using the image reading apparatus 301 of the first embodiment with the above-described arrangement will be explained with reference to the flow chart of FIG. 4.

In step S301, the cold cathode fluorescent lamps 102 and 103 are turned on in accordance with an instruction from the system controller 126. In step S302, the optical unit B moves from a predetermined standby position to the reading start position of the transparent document 101. In step S303, light from the cold cathode fluorescent lamps 102 and 103 that has passed through the transparent document 101 is read as a visible light image by the CCD image sensor 115. The image signal is sent to the personal computer 125 via the analog signal processing circuit 120, A/D conversion circuit 121, image processing circuit 122, line buffer 127, and interface 124. The image signal is saved in the visible light image memory 322. At this time, the glass plate 114 is set at the position 114a where the optical axis 113 is substantially normal to the glass plate 114.

In step S304, the optical unit B returns to the predetermined standby position. In step S305, the cold cathode fluorescent lamps 102 and 103 are turned off, and the infrared LED arrays 104 and 105 are turned on in accordance with instructions from the system controller 126. In step S306, the optical unit B moves to the reading start position of the transparent document 101. In step S307, light from the infrared LED arrays 104 and 105 that has passed through the transparent document 101 is read as an infrared image by the CCD image sensor 115. Similar to the visible light image, the image signal is sent to the personal computer 125 via the interface 124, and saved in the infrared image memory 323. At this time, the glass plate 114 is set at the position 114b and retracts outside the optical path.

In step S308, the infrared LED arrays 104 and 105 are turned off, and the cold cathode fluorescent lamps 102 and 103 are turned on. In step S309, the optical unit B returns to the predetermined standby position, and waits for reading operation of the next visible light image. In this manner, the cold cathode fluorescent lamps 102 and 103 are immediately turned on because a relatively long time is required until the light quantities of the cold cathode fluorescent lamps 102 and 103 settle to predetermined values after ON operation.

The glass plate 114 is used to correct the optical path length difference caused by the wavelength difference between visible light and infrared light. Letting t be the glass thickness and n be the refractive index (generally n=1.51), an optical path length difference $\Delta L$ is given by $$\Delta L = t \cdot (n-1)/n$$

The glass thickness t is so determined as to make the optical path length difference $\Delta L$ be equal to the optical path length difference caused by the wavelength difference between a main wavelength of about 550 nm for, e.g., a G image as a visible light wavelength and an infrared wavelength of about 880 nm.

Figure 5:
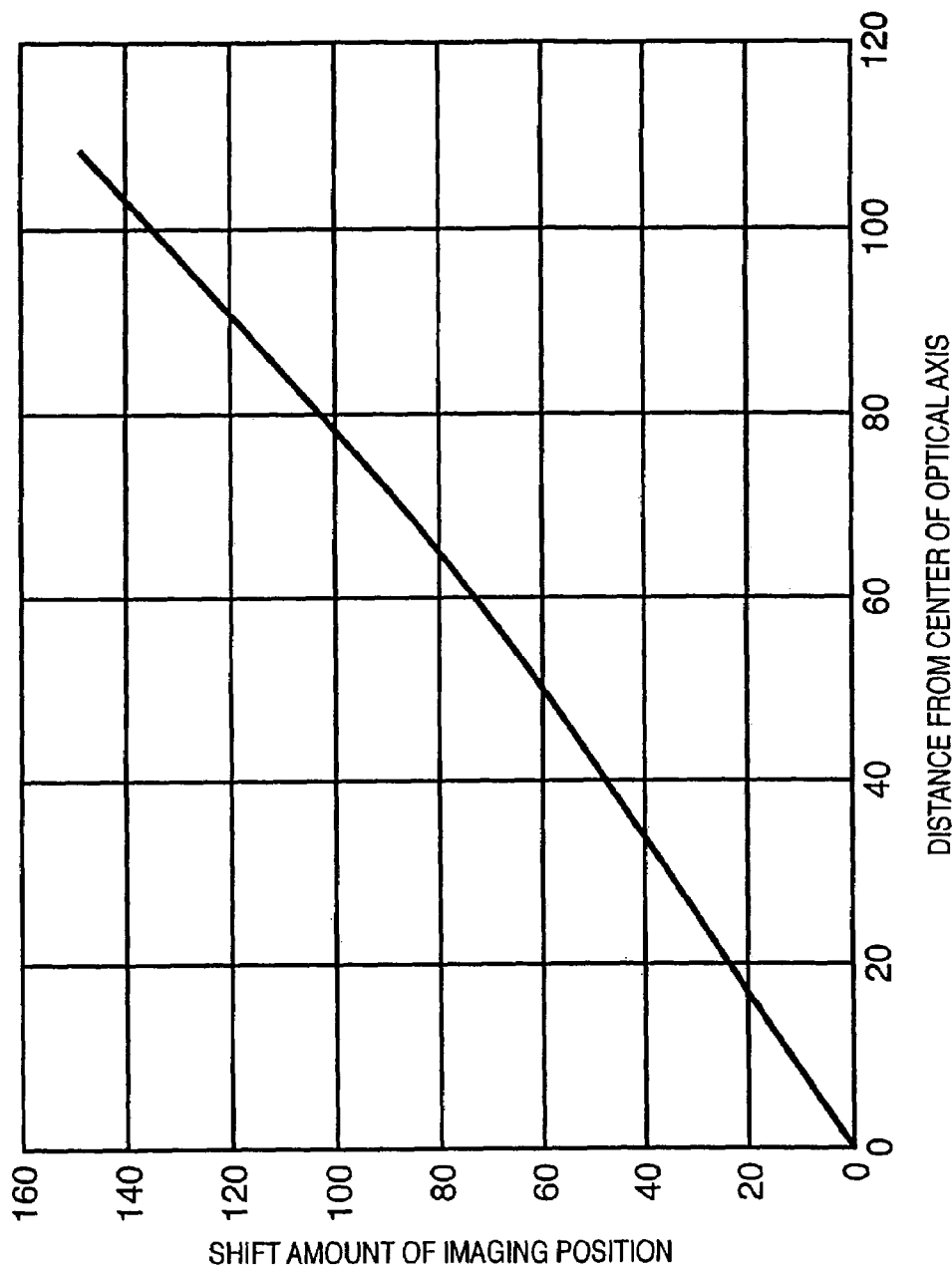
FIG. 5 is a graph showing the shift amount of the imaging position of an infrared image with respect to the imaging position of a visible light image.

In step S310, the read infrared image undergoes correction of the magnification difference of the imaging lens 112. FIG. 5 illustrates an example of a graph showing the degree of the difference from the center of the optical axis toward an end in the main scan direction between the imaging position of a visible light image obtained by inserting the glass plate 114 at the position 114a in the optical path and the imaging position of an infrared light image obtained by retracting the glass plate 114 to the position 114b outside the optical path. As shown in FIG. 5, the difference in imaging position caused by the magnification difference becomes larger when closer to the end. The magnification correction unit 331 executes an arithmetic process for accurately correcting the difference in imaging position. For example, the magnification correction unit 331 incorporates a table like FIG. 5, and performs an arithmetic process of correcting the image position by a shift amount depending on the position of image data from the center of the optical axis. This achieves accurate magnification correction. As another method, a high-order function which represents a curve such as the one shown in FIG. 5 can also be used to perform accurate magnification correction without any table. The magnification can be almost accurately corrected using a linear function by approximating a curve as shown in FIG. 5 into a polygonal line.

In step S311, the positional shift amount between the visible light image and the infrared image is corrected. The two images are read by separate reading operations, the positions of the images do not strictly coincide with each other in both the main scan direction and sub-scan direction, and a small positional shift occurs. The positional shift correction unit 332 executes an arithmetic process for accurately correcting such a positional shift. Detailed contents of this positional shift correction process are applied as Japanese Patent Application No. 2000-33919( JPA2001-223892) by the present applicant. In the present invention, the positional shift correction process between visible and infrared images is performed in the sub-scan direction, and then in the main scan direction owing to the following reason.

When an image is read several times under the same reading conditions, the direction in which the optical system moves, i.e., the reading position precision in the sub-scan direction varies more readily than in the main scan direction. This is because the reading start position is managed by, e.g., the moving amount of a motor (not shown) for moving the optical unit B, and no absolute position is measured. To the contrary, the position in the main scan direction is fixed by a shaft (not shown) in most scanners, so that the reading position precision is high. From this, the positional shift amount between a visible light image and an infrared image becomes larger in the sub-scan direction.

Hence, when positional shift correction is to be executed, a positional shift correction process is done in the sub-scan direction in which the positional shift amount is large, and then in the main scan direction in which the positional shift amount is small. This yields an accurate positional shift correction process.

Figure 29:
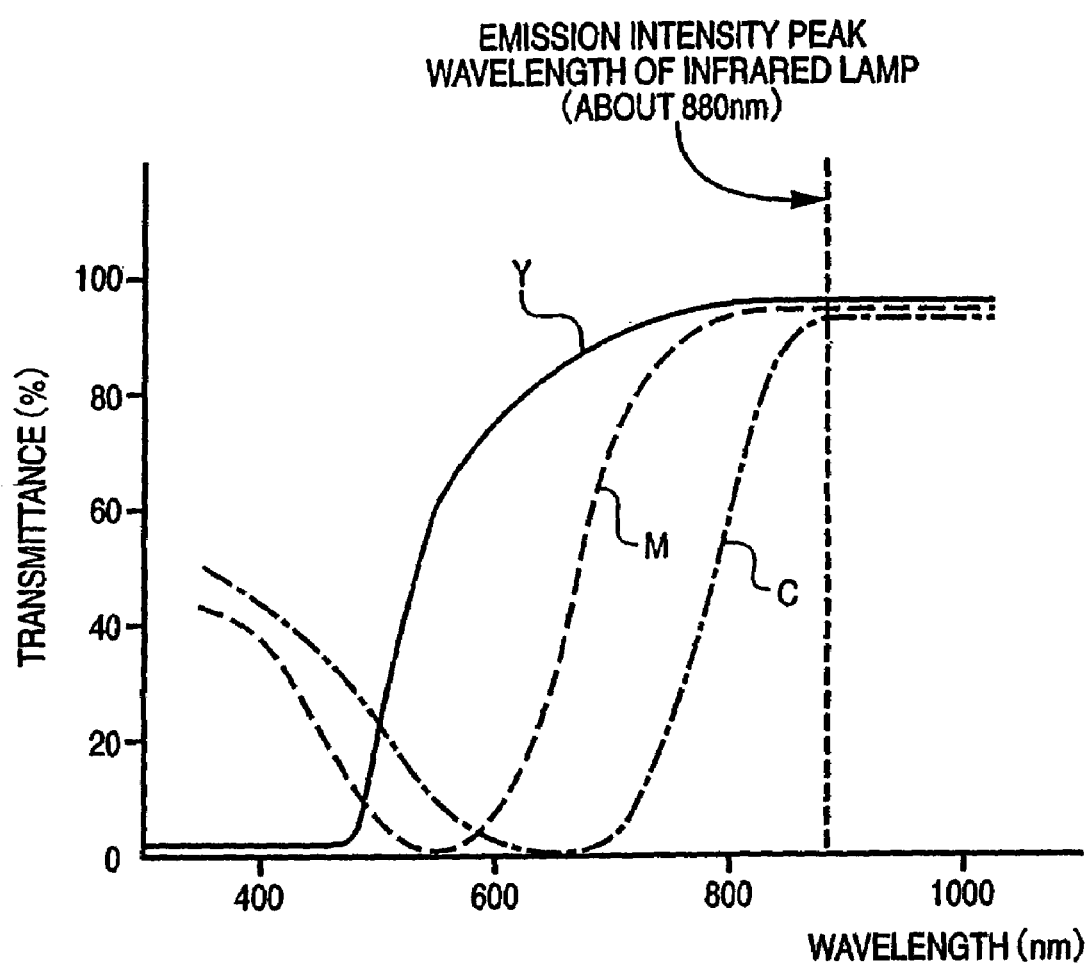
FIG. 29 is a graph showing the spectral transmittance characteristics of three different dyes in a general color film, and the peak wavelength of the spectral intensity distribution of an infrared lamp.

In step S312, the visible light image is added/subtracted to/from the infrared image at a predetermined ratio. A color film generally exhibits the spectral transmittance characteristic of each dye, as shown in FIG. 29, but does not completely transmit even infrared light. An image corresponding to the amount of each dye is slightly reflected even on an infrared image. To solve this phenomenon, the reflection correction unit 333 adds/subtracts R, G, and B image data of the visible light image to/from infrared image data at a predetermined ratio. For example, the yellow dye of a given color filter has a transmittance of 95% at an infrared wavelength; the magenta dye, 93%; and the cyan dye, 90%. In this case, the yellow dye does not transmit 5% of infrared light; the magenta dye, 7%; and the cyan dye, 10%. The untransmitted light (shadow) components are reflected on an infrared image. Visible light images corresponding to yellow, magenta, and cyan are B, G, and R images, respectively. For example, a portion containing a large amount of yellow dye exhibits a low gray level of B image data. By subtracting B, G, and R image data by 5%, 7%, and 10%, respectively, images of the respective dyes reflected on an infrared image can be canceled. When R, G, and B images after negative/position reversal are to be used for a negative film, R, G, and B images are added to an infrared image to cancel images of the respective dyes reflected on the infrared image.

In step S313, the dust/scratch detection unit 325 detects a dust/scratch portion from the infrared image. Details of the dust/scratch portion detection operation are described in Japanese Patent Application No. 2000-182905 (JPA2002-84421) which corresponds to US2002-000480 1AP) by the present applicant.

In step S314, the dust/scratch reduction unit 326 reduces the dust/scratch portion of the visible light image.

All the process steps have sequentially been described. Alternatively, the flow may skip the processes in step S311 and S312 after performing the magnification correction process in step S310, and may advance to the dust/scratch detection process in step S313. Similarly, the flow may skip the processes in steps S310 and S312, perform the positional shift correction process in step S311, and advance to the dust/scratch detection process in step S313. Similarly, the flow may skip the processes in steps S310 and S311, perform reflection correction in step S312, and advance to the dust/scratch detection process in step S313.

Since the first embodiment adopts infrared light as invisible light, the glass plate is inserted in the optical path in reading a visible light image. If ultraviolet light is employed as invisible light, the glass plate can be inserted in the optical path in reading an ultraviolet image, and retracted from the optical path in reading a visible light image.

As described above, according to the first embodiment, the characteristics of a visible light source which requires a relatively long preparation time can be stabilized by devising the ON/OFF sequences of the visible and invisible light sources. The apparatus can prepare for the next scan operation immediately after the completion of the first scan operation.

Further, the optical path length difference can be corrected by a simple arrangement in which the glass plate as a means for correcting the optical path length difference between visible and invisible light images is inserted/retracted to/from the optical path.

Furthermore, the first embodiment defines the sequence of reading both visible and invisible light images, then detecting dust and scratches on a film on the basis of the invisible light image, and correcting a corresponding portion of the visible light image. The present invention can supply a high-precision dust/scratch reduction function.

<Second Embodiment>

Figure 6:
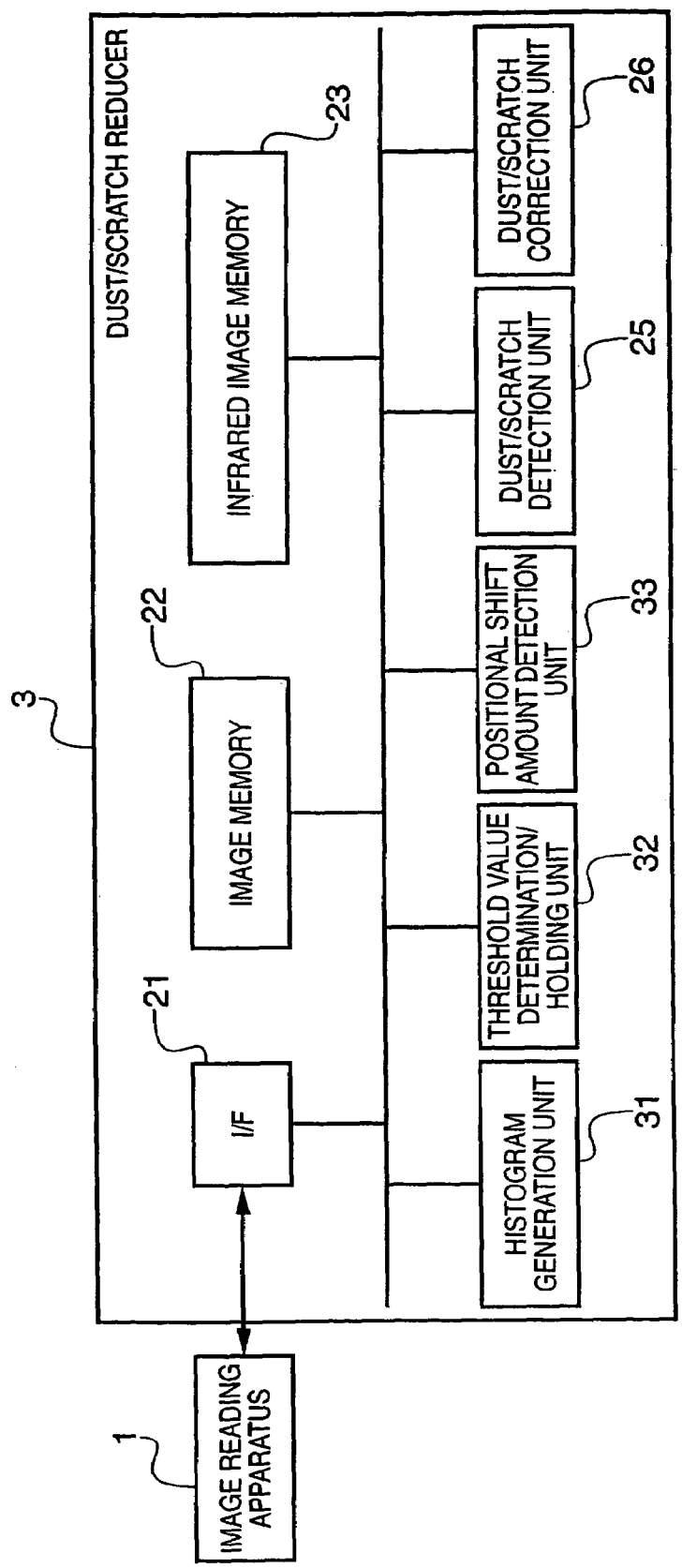
FIG. 6 is a block diagram showing the configuration of an image reading system according to a second embodiment of the present invention.
Figure 7:
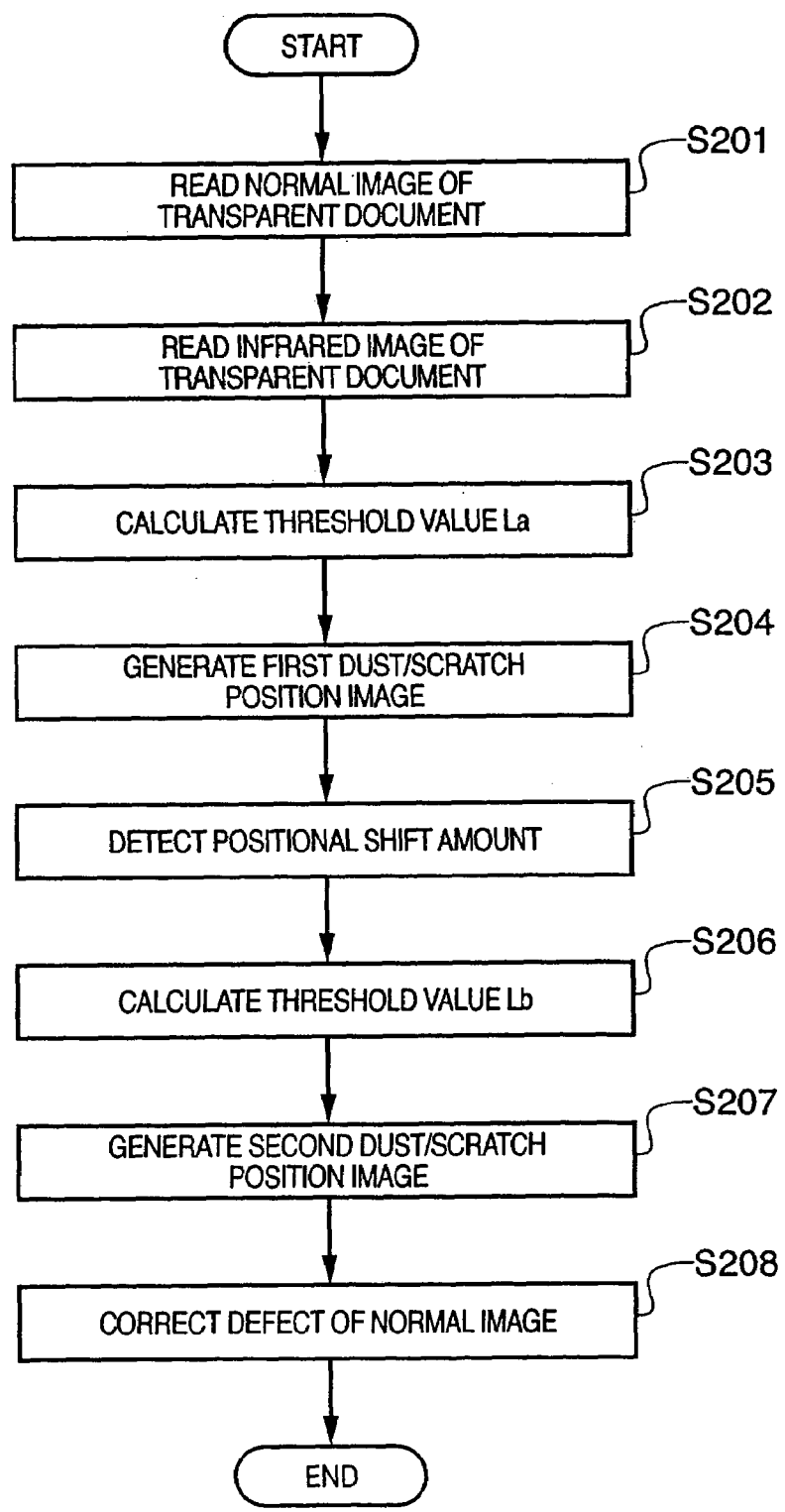
FIG. 7 is a flow chart showing a process in a dust/scratch reducer according to the second embodiment of the present invention.

The second embodiment will be described with reference to FIGS. 6 to 8. The arrangement of an image reading apparatus is the same as that shown in FIG. 26, and a description thereof will be omitted. FIG. 6 is a block diagram showing the functional arrangement of a dust/scratch reducer 3 for performing dust/scratch reduction for an image signal output from an image reading apparatus 1 of the second embodiment. The dust/scratch reducer 3 is an apparatus separated from the image reading apparatus 1 in FIG. 6, but may be incorporated in the image reading apparatus 1.

In FIG. 6, reference numeral 21 denotes an interface (I/F) for inputting image data read by the image reading apparatus 1; 22, an image memory for storing an image read using a transparent document illumination lamp 144 or reflecting document illumination lamp 145; 23, an infrared image memory for storing an image read using an infrared lamp 151 or an image representing a dust/scratch position; 25, a dust/scratch detection unit; 26, a dust/scratch correction unit; 31, a histogram generation unit; 32, a threshold value determination/holding unit; and 33, a positional shift amount detection unit.

Transparent document reading operation including dust/scratch reduction in the second embodiment will be explained in detail with reference to the flow chart of FIG. 7.

Figure 26:
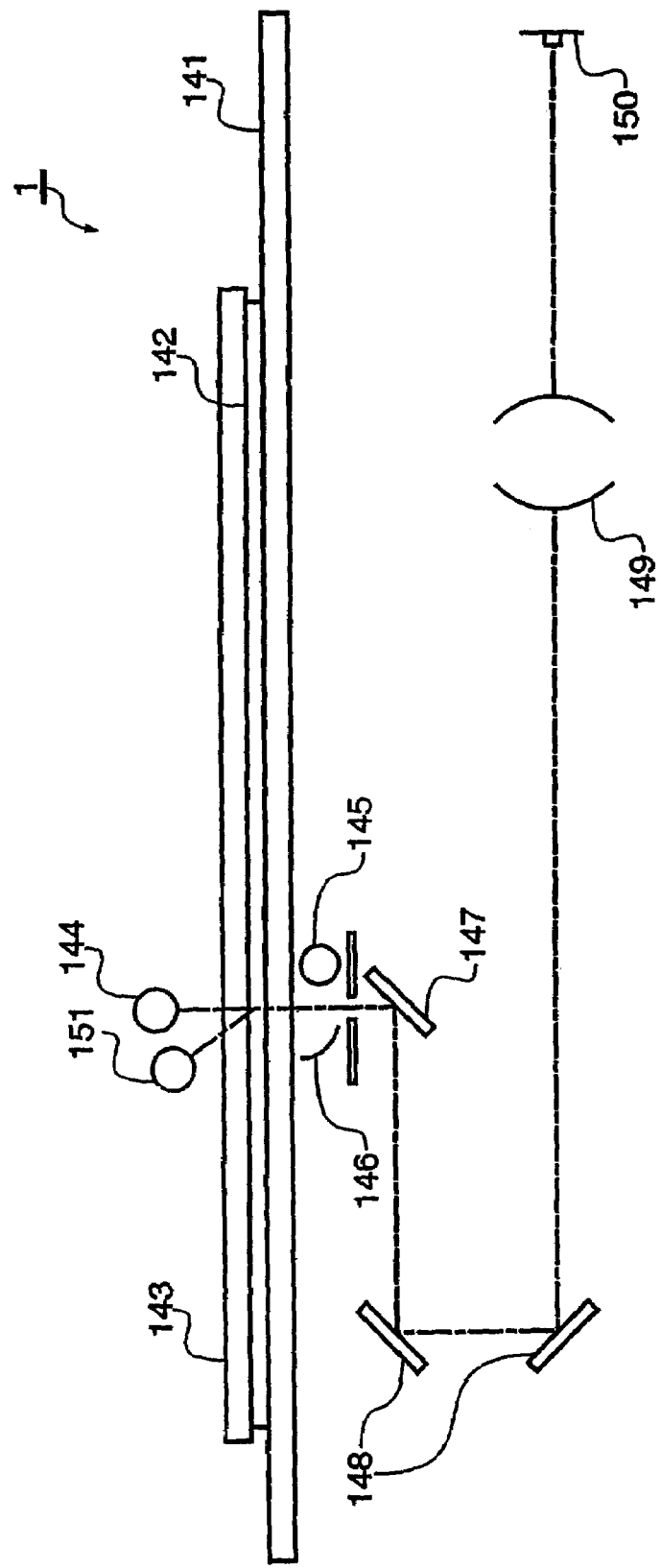
FIG. 26 is a schematic view showing the arrangement of a conventional image reading apparatus that detects a defect region formed by dust or scratch on a transparent document.

In step S201, the reflecting document illumination lamp 145 and infrared lamp 151 in FIG. 26 are turned off, and the transparent document illumination lamp 144 is turned on. An illumination light beam from the transparent document illumination lamp 144 is uniformly diffused by a diffusion plate 143. The diffused light beam passes through a transparent document 142. The transmitted light beam is reflected by a mirror 147 and inverted-V mirrors 148, passes through an imaging lens 149, and is projected onto a CCD 150. The image projected onto the CCD 150 is converted into an electrical signal, which is temporarily stored in the image memory 22 via the I/F 21 in FIG. 6. If the transparent document is a negative film, a reversal process is performed to obtain a positive image (to be referred to as a "normal image" hereinafter), which is temporarily stored in the image memory 22. Whether the a transparent document is a negative or positive film is designated by the user in advance.

Figure 28:
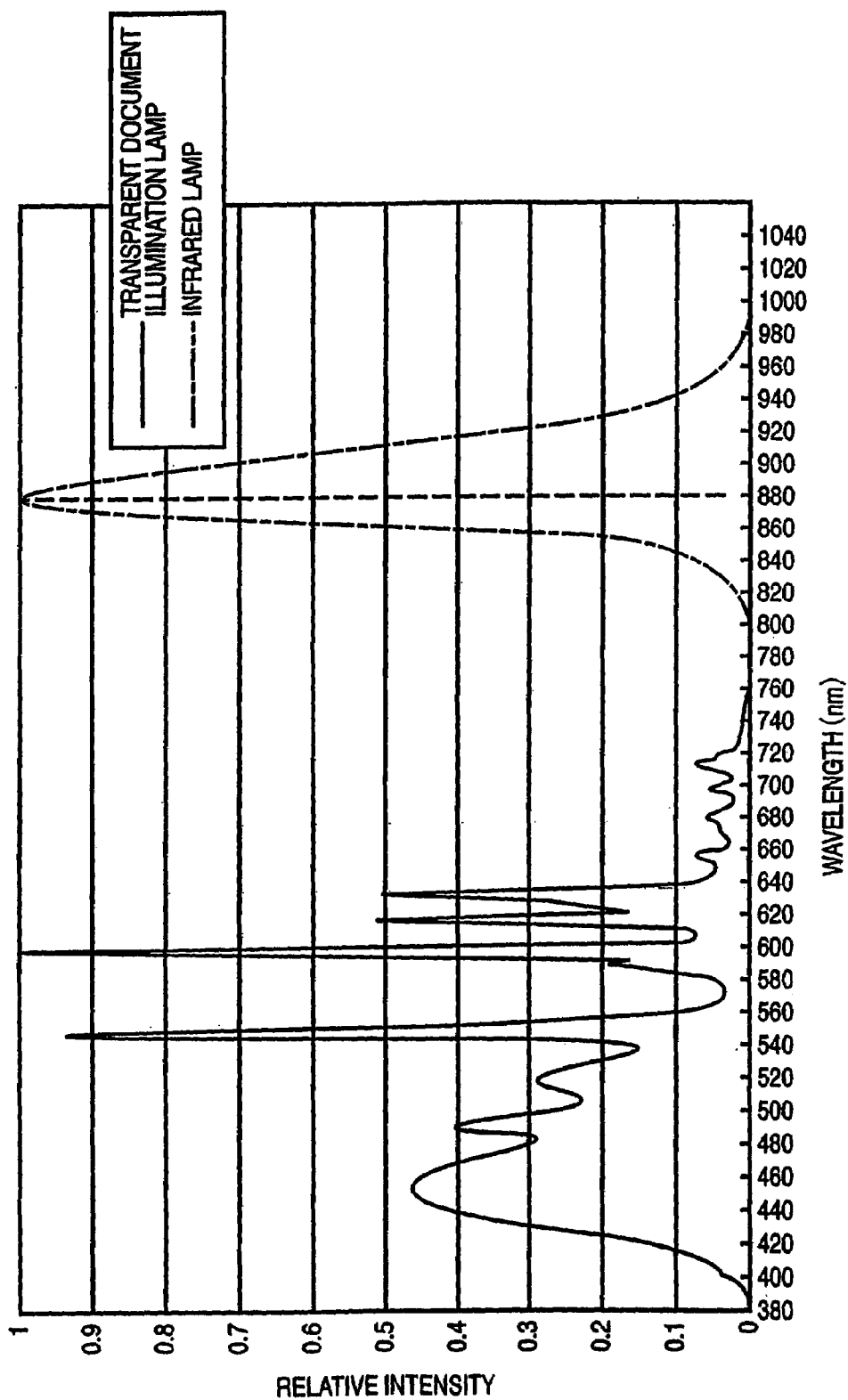
FIG. 28 is a graph showing the spectral intensity distributions of a transparent document illumination lamp and infrared lamp.

In step S202, the reflecting document illumination lamp 145 and transparent document illumination lamp 144 in FIG. 26 are turned off, and the infrared lamp 151 is turned on. An illumination light beam from the infrared lamp 151 having a characteristic as FIG. 28 is uniformly diffused by the diffusion plate 143. The diffused light beam passes through the transparent document 142. The light beam via the mirror 147, inverted-V mirrors 148, and imaging lens 149 is projected onto the CCD 150. The illumination light beam from the infrared lamp 151 that has passed through the transparent document 142 is transmitted regardless of an image (photosensitive image) of the transparent document 142 such as a negative film or positive film, as shown in FIG. 28. An image of dust, a scratch, or the like, which physically intercepts the optical path, is projected as a shadow onto the CCD 150. The infrared image projected onto the CCD 150 is converted into an electrical image (to be referred to as an "infrared image" hereinafter), which is temporarily stored in the infrared image memory 23 via the I/F 21 in FIG. 6.

In step S203, the threshold value determination/holding unit 32 calculates and holds a threshold value La to be used in step S204 by using the infrared image data temporarily stored in the infrared image memory 23. This calculation method will be explained later.

In step S204, the dust/scratch detection unit 25 reads out the threshold value La from the threshold value determination/holding unit 32, and reads out the infrared image data from the infrared image memory 23. The dust/scratch detection unit 25 compares the infrared image data with the threshold value La to detect a dust/scratch and generate a first dust/scratch position image. The first dust/scratch position image is temporarily stored in the infrared image memory 23.

In step S205, the positional shift amount detection unit 33 detects the positional shift amount between the normal image stored in the image memory 22 and the first dust/scratch position image stored in the infrared image memory 23. Details of detection will be described later.

In step S206, the threshold value determination/holding unit 32 calculates and holds a threshold value Lb to be used in step S207 by using the infrared image data temporarily stored in the infrared image memory 23. The Lb calculation method will also be explained later.

In step S207, the dust/scratch detection unit 25 reads out the threshold value Lb from the threshold value determination/holding unit 32, and reads out the infrared image data from the infrared image memory 23. The dust/scratch detection unit 25 compares the infrared image data with the threshold value Lb to detect a dust/scratch and generate a second dust/scratch position image. The second dust/scratch position image is temporarily stored in the infrared image memory 23.

In step S208, the correction unit 26 reads out the dust/scratch position from the second dust/scratch position image stored in the infrared image memory 23, and shifts the position by the positional shift amount detected in step S205. Image data of the normal image stored in the image memory 22 that corresponds to the shifted position is determined as data of a defect region having a defect due to dust or a scratch. Data of the defect region of the normal image is interpolated from the peripheral non-defect region, thus reducing the dust/scratch influence. Image data of the normal image corresponding to the position shifted by the positional shift amount detected in step S205 is corrected for all the dust/scratch positions of the second dust/scratch position image. Accordingly, a normal image on which the dust/scratch influence is reduced can be attained.

Detection of the positional shift amount in step S205 and the calculation methods of the threshold values La and Lb in steps S203 and S206 will be described.

(Detection of Positional Shift Amount)

Detection of the positional shift amount between a normal image and the first dust/scratch position image by the positional shift amount detection unit 33 will be explained with reference to FIGS. 8, 9A, 9B, and 10A to 10C.

FIG. 8 is a flow chart showing detection of the positional shift amount. FIGS. 9A and 9B are schematic views for explaining positional shift correction in the second embodiment. As shown in FIGS. 9A and 9B, the down direction is a sub-scan direction, and the transverse direction is a main scan direction. In FIG. 9A, reference numerals 401 and 402 denote detected pixels which are influenced by dust and scratches on an infrared image. The coordinates of pixels 403 and 404 on a normal image in FIG. 9B correspond to those of the pixels 401 and 402. In practice, however, a positional shift is generated between the infrared image and the normal image, as described above. The dust/scratch pixel 401 may shift from the pixel 403 by several upper/lower pixels.

On a normal image, the dust/scratch position image data is expressed at a low density value for a positive film or at a high density value for a negative film after reversal. The density values of pixels are obtained within a range of ±N pixels in the sub-scan direction from the coordinates of the dust/scratch pixel 403 on the normal image that correspond to the coordinates of the dust/scratch pixel 401 on the infrared image. Among the obtained (2N+1) pixels, a pixel having the lowest density value for a positive film or a pixel having the highest density value for a negative film is determined to be a pixel corresponding to dust or a scratch on the normal image. Then, the shift amount between the normal image and the infrared image can be calculated. However, if the shift amount is determined using only one pixel, a positional shift may be erroneously determined, and some dust/scratch pixels may not be detected. To prevent this, the positional shift determination precision is increased by calculating the sum of density values of pixels at the dust/scratch pixel positions on the normal image for each shift amount.

FIGS. 10A to 10C show examples of this calculation. FIG. 10A shows an example for a positive film when the shift detection range is N=10. Pixels (1), (2), (3), . . . are all pixels determined as dust/scratch pixels on an infrared image. The positions of pixels (1), (2), (3), . . . are shifted pixel by pixel in the sub-scan direction within a range of ±10 pixels on a corresponding normal image, and density values of the pixels (1), (2), (3), . . . are obtained at each shifted point (step S211). The density values of pixels on the normal image corresponding to dust/scratch pixels are summed up for each shift amount (step S212). In the example of FIG. 10A, the sum for a shift amount of +1 pixel is the minimum value. In this case, the shift amount between the infrared image and the normal image is determined to +1 pixel in the sub-scan direction (step S213). When dust and scratches are detected, correction is done using the determined shift amount. Note that the same result can also be obtained using the average value of density values in place of their sum. In step S214, a shift correction amount is similarly determined also in the main scan direction.

The example of FIG. 10A calculates for each shift amount the sum of the density values of pixels on a normal image that correspond to pixels (1), (2), (3), . . . determined as dust/scratch pixels on an infrared image. To decrease the calculation amount and shorten the calculation time, target pixels whose density values are to be obtained may be halved, like pixels (1), (3), (5), . . . .

Alternatively, as shown in FIG. 10C, the sum of density values may be calculated for a shift amount of not every pixel but every two pixels. In this case, compared to the example shown in FIG. 10A, the calculation amount can be reduced to almost ¼, thus shortening the calculation time.

(Calculation of Threshold Values La and Lb)

Calculation of the threshold values La and Lb used when the threshold value determination/holding unit 32 detects a dust/scratch position from an infrared image will be described.

To detect a dust/scratch position by reading a transparent document by infrared light, a threshold is obtained from the histogram of an infrared image. Pixels lower than the threshold value are determined as dust/scratch pixels, and pixels on a normal image corresponding to the determined pixels are corrected.

As a method of determining a threshold value, a value attained by subtracting the product of a standard deviation value by n times from an average value calculated from the histogram of the infrared image is set as a threshold value. Equation (1) represents this method:

$$\text{Threshold} = \text{Average} - SD \times n \quad (1)$$

Threshold: threshold value, Average: the average value of an infrared image, SD: the standard deviation of the infrared image, and n: coefficient FIG. 28 is a graph showing the spectral intensity distributions of visible light and infrared light (peak wavelength: 880 nm). FIG. 29 is a graph showing the transmittances of yellow, magenta, and cyan dyes of a general negative/positive color film.

As is apparent from FIG. 29, most light components from the infrared lamp are transmitted through a general color film because all dyes have very high transmittance around infrared light. Although the transmittance is very high, but is not 100%. Some film components exhibit low transmittance around infrared light. When, for example, such a film is scanned with infrared light, not only dust and scratches, but also image information which should be obtained by visible light may be reflected on an infrared image because of the above-described reason. If such image information is reflected in calculating the shift amount between the infrared image and the normal image, the shift correction amount may be erroneously calculated. To prevent this, different threshold values are used in the first dust/scratch detection for positional shift correction in step S204 of FIG. 7 and the second dust/scratch detection for dust/scratch correction in step S207.

FIG. 11 shows an example of the histogram of an infrared image. Ta 602 corresponds to the first threshold value La; and Tb 603, to the second threshold value Lb. The first threshold value Ta is used to measure a shift correction amount, and is set to a relatively low level so as to prevent reflection of any image other than dust and scratches from being detected as dust and scratches. The second threshold value Tb is used to determine dust and scratches whose influence should be reduced after shift correction, and is set to such a level as to prevent any dust/scratch detection omission even if a reflection of dye on the infrared image is detected as dust/scratches.

The dust/scratch detection sensitivity can be adjusted by setting the coefficient n in equation (1) described above. For excessively large n, detection omission may occur; for small n, detection omission hardly occurs, but a reflection of dye on the infrared image will be more likely detected.

By setting the constant n to b for the second threshold value Tb for dust/scratch detection, setting the constant n to a for the first threshold value Ta, and setting the relation between the two coefficients to a>b, the threshold value for positional shift correction is always lower than the threshold value used for dust/scratch detection for correction by a predetermined value, and the influence of reflection can be reduced.

FIG. 12 shows an example of the histogram when the image of the frame of a film holder is reflected on an infrared image. The film holder is used to fix a film when a transparent document is set on the image reading apparatus. The film holder is generally made of plastic or the like. If the image of the film holder is reflected in the reading region upon reading an infrared image, a film holder portion (to be referred to as a "holder shadow" hereinafter) exhibits a very low density value than those of general dust and scratches because the film holder does not transmit any light. A density average value 701, FIG. 12, of the infrared image becomes lower than the density average value obtained when no holder shadow exists. At the same time, the standard deviation becomes larger. Equation (2) represents equation (1) under the above situation. "Threshold" decreases, and first and second threshold values Ta' and Tb' also decrease to values 702 and 703 as in FIG. 12.

$$\text{Threshold}(\downarrow\downarrow) = \text{Average}(\downarrow) - SD(\uparrow) \times n \qquad (2)$$

In this case, the threshold value excessively decreases to the value 702 or 703 in FIG. 12 depending on the size of a reflected holder shadow. A dust/scratch determination error and positional shift determination error may occur. Even if no holder shadow is reflected, the same phenomenon may occur due to the reflection. To prevent this, a maximum limit value is set for the standard deviation SD. If a calculated standard deviation is larger than this limit, the influence of the holder shadow or reflection is determined to exist, and the standard deviation is replaced by a preset fixed value.

This can reduce the influence of reflection.

<Third Embodiment>

The third embodiment will be described with reference to FIGS. 13A to 13E, 14, and 15A to 15D. FIG. 13A shows a state in which dust 502 is on a film 501. FIG. 13B shows the gray level when the portion of FIG. 13A is read at a designated resolution by turning on a transparent document illumination lamp 144 shown in FIG. 26. Dust does not transmit any light, so the gray level distribution has a concave-up shape. FIG. 13C shows the gray level when the portion of FIG. 13A is read by turning on an infrared lamp 151 shown in FIG. 26, and particularly When this portion is read at a resolution much lower than a designated resolution. In this case, the portion of FIG. 13A is read at a very low resolution, and the gray level changes gradually. A gray level L2 having a difference by a value (or value set by a histogram and gray level analysis) set in advance as a predetermined level ΔL12 from a gray level L1 free from the dust/scratch influence in the infrared image view of FIG. 13C is set. A binarization process is performed using the gray level L2, determining dust/scratch detection information. P1 represents a dust/scratch width actually influenced by dust and scratches in FIG. 13B; and P2, a dust/scratch width determined as dust/scratch detection information in FIG. 13C. Since the dust 502 is read at a lower resolution in FIG. 13C, it is detected with the width P2 larger than P1. Thus, the dust/scratch position cannot be sufficiently accurately specified.

FIG. 13D shows the gray level when the portion of FIG. 13A is read by turning on the infrared lamp 151 shown in FIG. 26, and particularly when this portion is read at a designated resolution. In this case, the portion of FIG. 13A is read at a high resolution, and the gray level changes finely. A gray level L4 having a difference by a value (or value set by a histogram and gray level analysis) set in advance as a predetermined level ΔL34 from a gray level L3 free from the dust/scratch influence on the infrared image is set. A binarization process is performed using the gray level L4, determining dust/scratch detection information. P3 represents a dust/scratch width determined as dust/scratch detection information in FIG. 13D. Since the dust 502 is read at a designated resolution in FIG. 13D, it is detected with the width P3 almost equal to P1. Thus, the dust/scratch position can be accurately specified.

As shown in FIGS. 13C and 13D, information to be obtained from an infrared image is not the resolution or gray level distribution, but the dust/scratch width. In other words, it suffices the dust/scratch width is specified even at a resolution lower than a designated resolution. Even if an image is read at a resolution about ½ the designated resolution, a dust/scratch width can be almost accurately specified by setting a predetermined threshold value.

FIG. 13E shows the gray level when the portion of FIG. 13A is read by turning on the infrared lamp 151 shown in FIG. 26, and particularly when this portion is read at a resolution ½ a designated resolution. Also in this case, the gray level changes finely, similar to the case wherein dust/scratch information is read at the designated resolution. A gray level L6 having a difference by a value (or value set by a histogram and gray level analysis) set in advance as a predetermined level ΔL56 from a gray level L5 free from the dust/scratch influence on the infrared image is set. A binarization process is performed using the gray level L6, defining dust/scratch detection information. P4 represents a dust/scratch width determined as dust/scratch detection information in FIG. 13E. Even if the dust 502 is read at a resolution ½ the designated resolution in FIG. 13E, it is detected with the width P4 almost equal to P1. The dust/scratch position can be accurately specified.

That is, using an infrared image as shown in FIG. 13E can accurately specify a dust/scratch position. This effect offers a high-speed process without degrading the dust/scratch reduction function even when an infrared image is read at a resolution ½ a designated resolution.

Figure 15A:
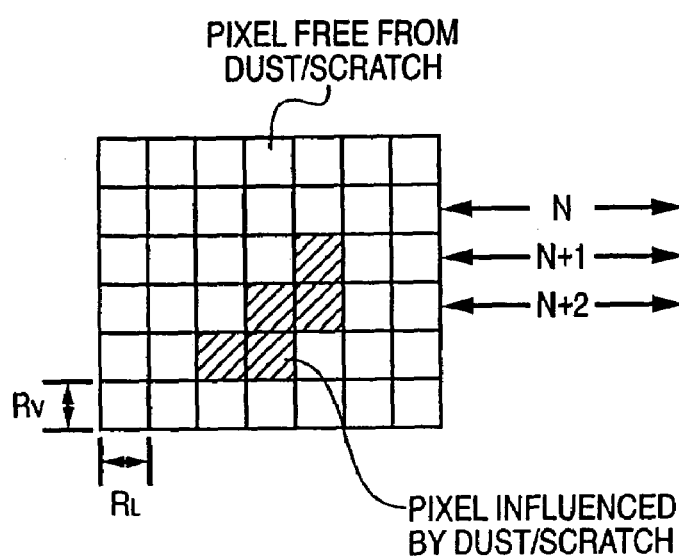
FIGS. 15A to 15D are schematic views for explaining the third and fourth embodiments of the present invention.
Figure 15B:
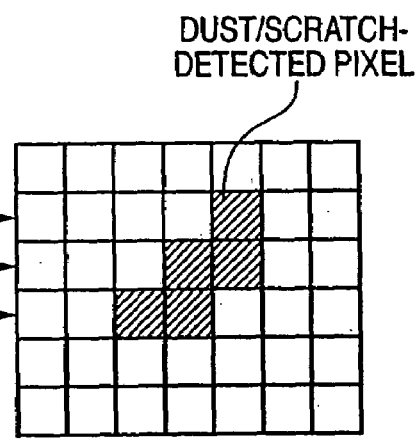
Figure 15C:
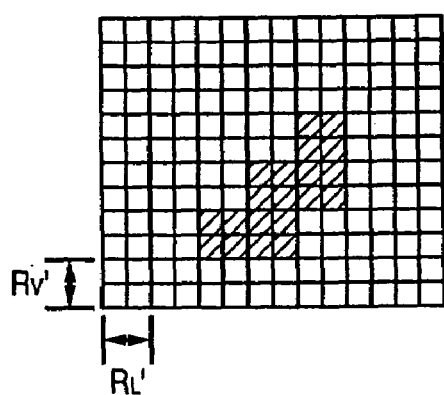
Figure 15D:
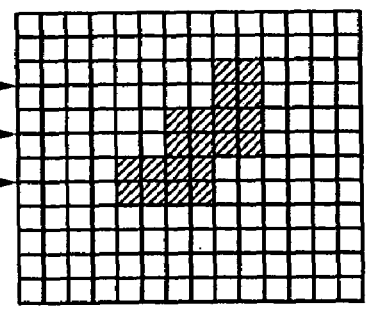

FIGS. 15A to 15D are schematic views showing read images. As examples of images read by an image reading apparatus 1, FIGS. 15A and 15C show normal images, and FIGS. 15B and 15D show infrared images when a positive film including dust and scratches is read. FIGS. 15A and 15B show images attained by reading normal and infrared images at a low resolution. FIGS. 15C and 15D show images read at a resolution twice that of the images shown in FIGS. 15A and 15B. FIGS. 15A to 15D spatially show images with pixel widths RL' and RL in the main scan direction and pixel widths RV' and RV in the sub-scan direction. FIG. 15D is also used for explanation as a view enlarged twice FIG. 15B. On the normal images of FIGS. 15A and 15C, dust/scratch portions provide low-density-level pixel information. On the infrared images of FIGS. 15B and 15D, these pieces of pixel information are binarized by a dust/scratch detection process to clarify the dust/scratch positions.

Figure 14:
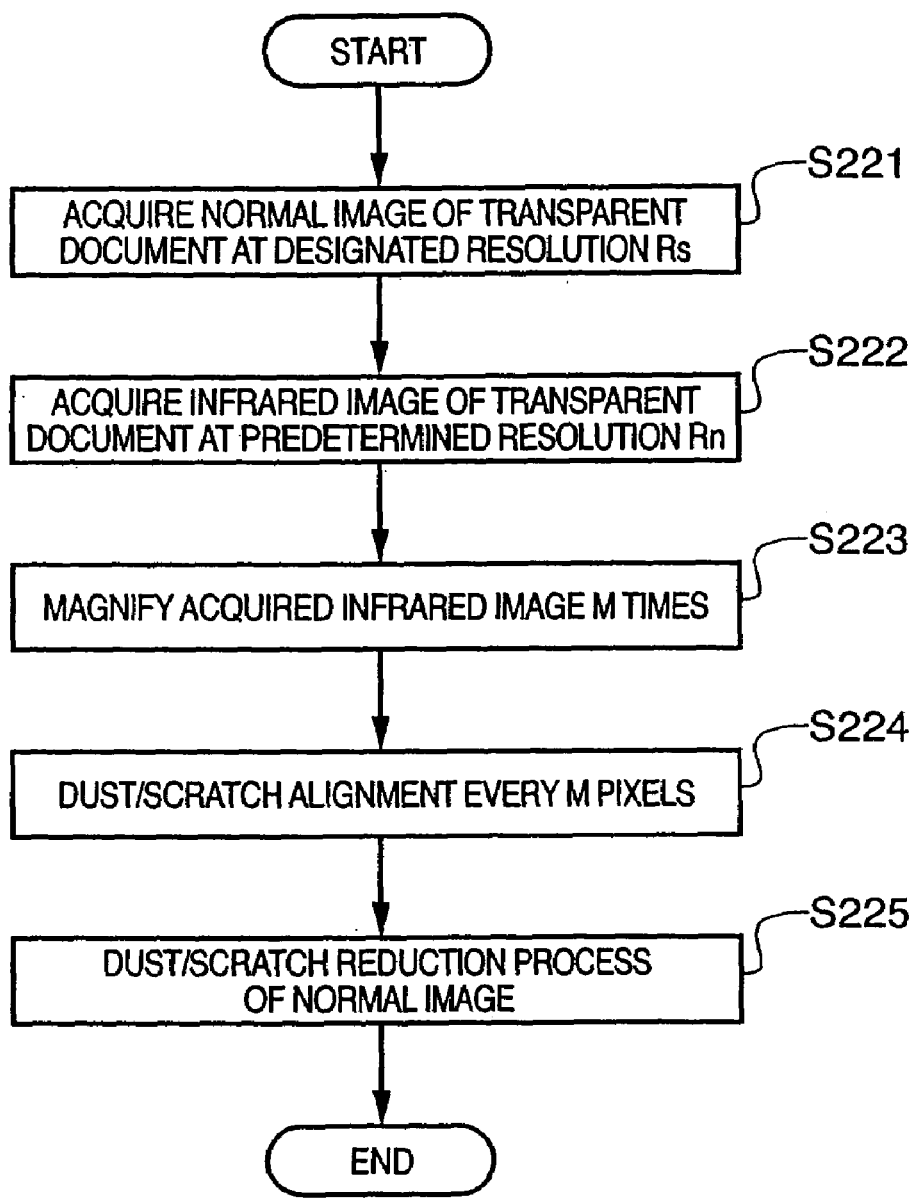
FIG. 14 is a flow chart showing a process in an image reading apparatus according to the third embodiment of the present invention.

Transparent document reading operation including dust/scratch reduction will be explained with reference to the flow chart of FIG. 14.

Figure 27:
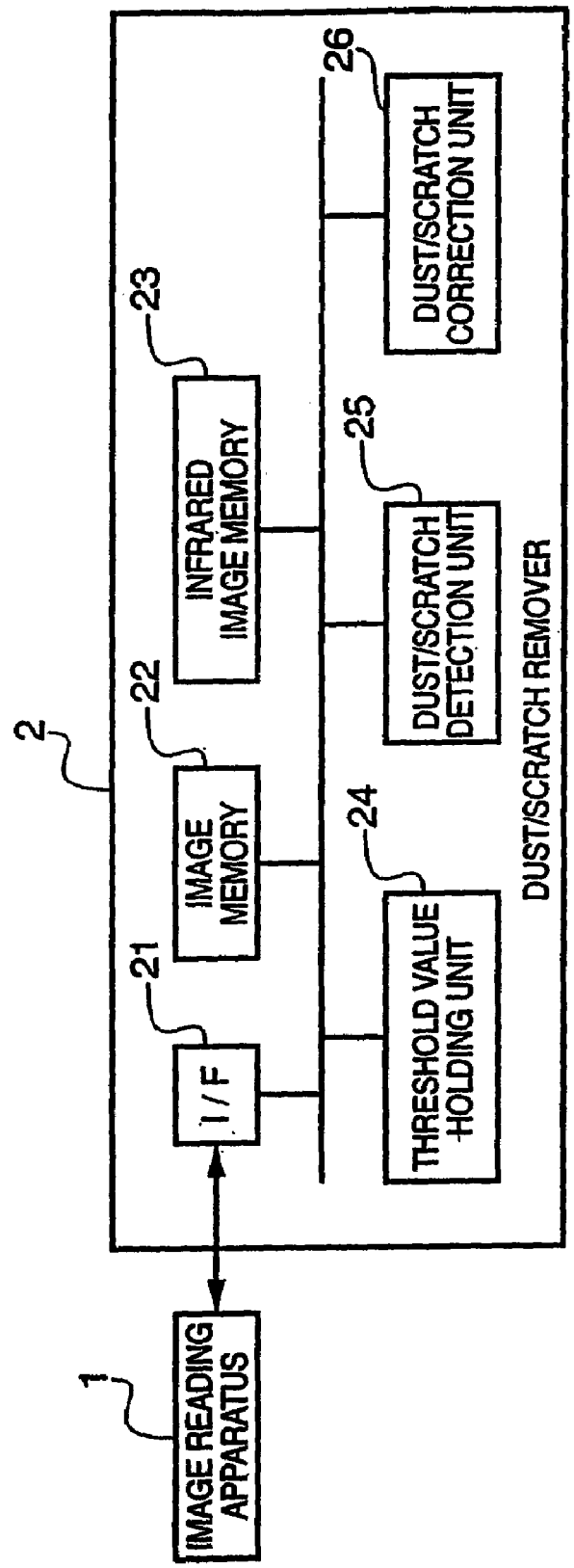
FIG. 27 is a block diagram showing the arrangement of a conventional image reading system.

In step S221, a reflecting document illumination lamp 145 and the infrared lamp 151 in FIG. 26 are turned off, and the transparent document illumination lamp 144 is turned on. An illumination light beam from the transparent document illumination lamp 144 is uniformly diffused by a diffusion plate 143. The diffused light beam passes through a transparent document 142. The transmitted light beam is reflected by a mirror 147 and inverted-V mirrors 148, passes through an imaging lens 149, and is projected onto a CCD 150. The image projected onto the CCD 150 is converted into an electrical signal, which is temporarily stored in an image memory 22 via an I/F 21 in FIG. 27. At this time, a normal image read at a designated resolution Rs is obtained.

In step S222, the reflecting document illumination lamp 145 and transparent document illumination lamp 144 in FIG. 26 are turned off, and the infrared lamp 151 is turned on. An illumination light beam from the infrared lamp 151 having a characteristic as FIG. 28 is uniformly diffused by the diffusion plate 143. The diffused light beam passes through the transparent document 142. The light beam via the mirror 147, inverted-V mirrors 148, and imaging lens 149 is projected onto the CCD 150. The illumination light beam from the infrared lamp 151 that has passed through the transparent document 142 is transmitted regardless of an image (photosensitive image) of the transparent document 142 such as a negative film or positive film, as shown in FIG. 29. An image of dust, a scratch, or the like, which physically intercepts the optical path, is projected as a shadow onto the CCD 150. The infrared image projected onto the CCD 150 is converted into an electrical image, which is temporarily stored in the infrared image memory 23 via the I/F 21 in FIG. 6. At this time, an infrared image read at a predetermined resolution Rn lower than the designated resolution Rs is obtained.

In step S223, the infrared image obtained in step S222 undergoes a magnification process by magnifying M times the predetermined resolution Rn to the designated resolution Rs. Note that M=Rs/Rn. This allows the infrared image to use a spatial distance at the same pixel unit as the designated resolution.

Figure 17:
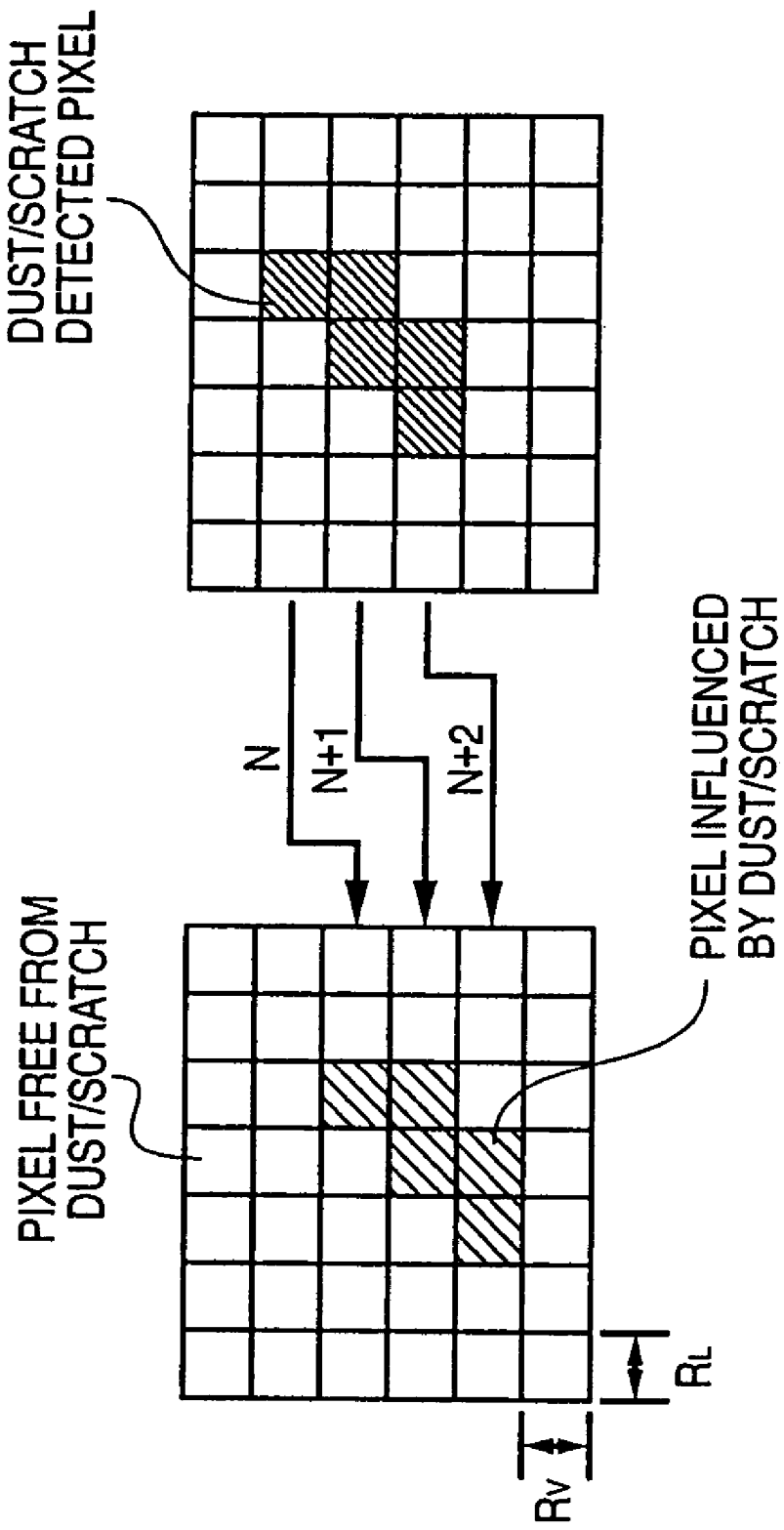
FIGS. 17A and 17B are schematic views for a low resolution according to a fifth embodiment of the present invention.

In step S224, a positional shift amount when dust/scratch positions shift depending on the scanning precisions of the normal and infrared images in S221 and S223, as shown in FIGS. 17A and 17B, is detected every N pixels of the normal image in order to detect dust/scratch positions on the normal image. Details of positional shift amount detection have been described in the second embodiment with reference to FIGS. 8 to 1C. If, for example, the resolution is changed into one as shown in FIG. 15D by magnifying twice the dust/scratch position image in FIG. 15B, the shift amount is detected every two pixels. That is, the shift amount of the entire image is detected from the sum of densities detected every M pixels corresponding to the magnification M (see FIG. 10C).

In step S225, the dust/scratch image in the normal image is retouched. In this case, dust and scratches in pixels of the normal image that correspond to positions attained by shifting dust/scratch positions on the infrared image by the shift amount detected in step S224 are retouched. Then, the dust/scratch reduction process ends. This flow chart can increase the reading speed of the infrared image. The process speed can be increased without degrading the dust/scratch reduction performance.

<Fourth Embodiment>

The fourth embodiment will be described with reference to FIGS. 15A to 15D and 16. FIGS. 15A to 15D have already been described in the third embodiment. Transparent document reading operation including dust/scratch reduction will be explained with reference to the flow chart of FIG. 16.

Steps S101 and S102 are similar to steps S221 and S222 described in the third embodiment except that an image is read at the resolution Rs in step S102, as in step S101. If the resolutions are very high, an infrared image may not be necessarily read at a resolution higher than a given one in order to specify dust/scratch positions, as described in the second embodiment with reference to FIGS. 13A to 13E. The same effects can also be obtained when normal and infrared images are aligned. This threshold resolution is set to a predetermined resolution Rd.

In step S103, whether the resolution of an infrared image attained in step S102 is lower than the predetermined resolution Rd is checked. If YES in step S103, the flow advances to steps S104 and S106 to detect the shift amount of a dust/scratch position every pixel. If NO in step S103, the flow advances to steps S105 and S106. For a very high designated resolution, sums of the densities of pixels on the normal image corresponding to dust/scratch pixels detected on the infrared image is calculated by shifting Rs/Rd pixels each time, which can increase the process speed, as shown in FIG. 10C (step S105).

In step S106, dust/scratch positions are corrected by the detected positional shift amount, and the dust/scratch portion in the normal image is retouched. Then, the dust/scratch reduction process ends. This flow chart can increase the speed of the dust/scratch alignment process between normal and infrared images for a very high designated resolution. As a result, the process speed can be increased without degrading the dust/scratch reduction performance.

Figure 16:
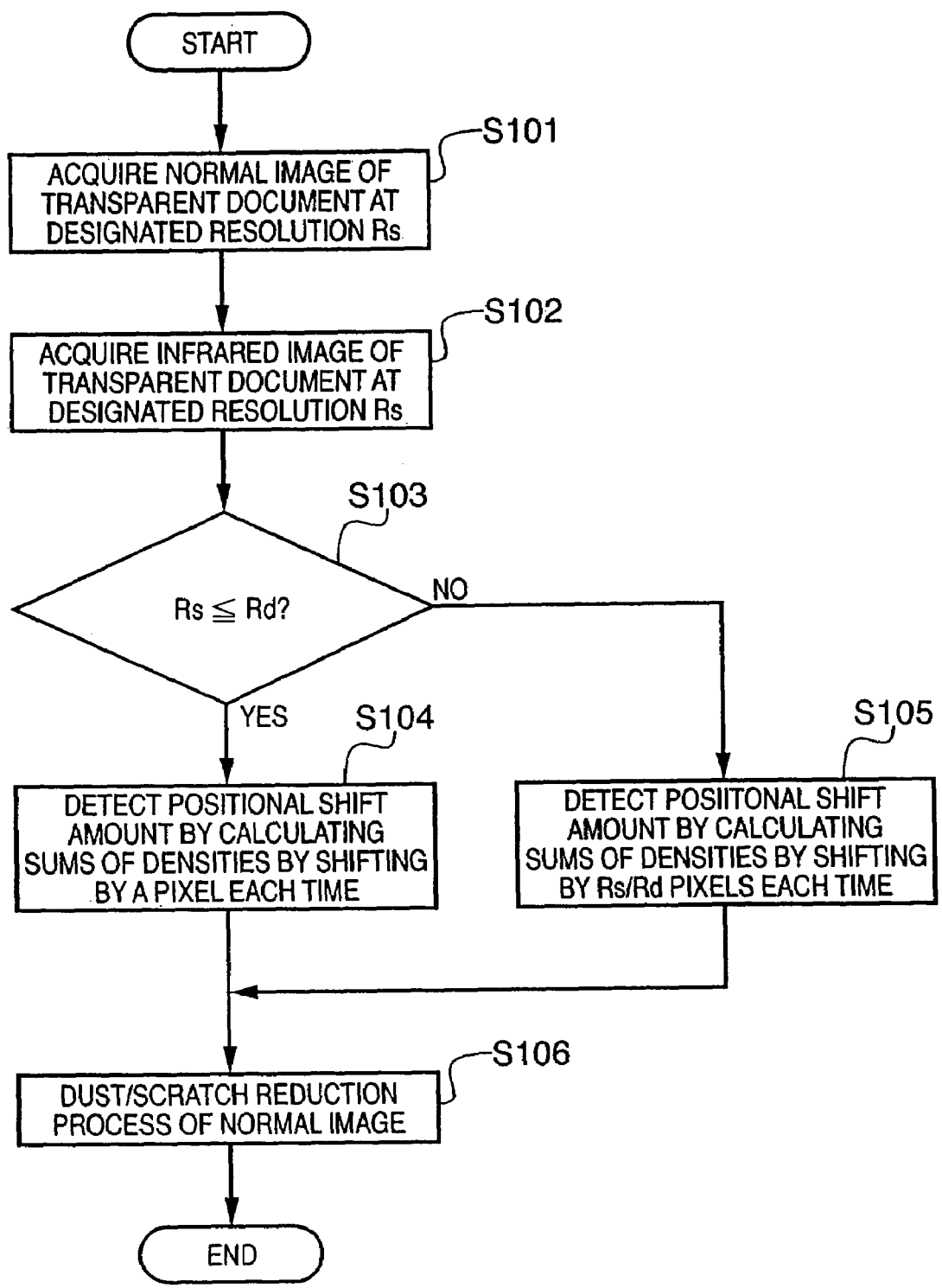
FIG. 16 is a flow chart showing a process in an image reading apparatus according to the fourth embodiment of the present invention.

If (Rs/Rd) is 2 in step S105 of FIG. 16 in the fourth embodiment, positional shift detection is done every two pixels, as shown in FIGS. 15C and 15D. In this case, the sums of the densities of the pixels of the normal image corresponding to the dust/scratch pixels detected in the infrared image are calculated by shifting by two pixels in both the main scan direction and sub-scan direction. For this purpose, calculation as shown in FIG. 10C is performed to detect a shift amount. In FIG. 10C, the calculation amount is ¼ that in FIG. 1A.

As described above, the image reading apparatuses described in the second to fourth embodiments can achieve dust/scratch correction without any problem by detecting a shift amount and performing shift correction even if a positional shift occurs between a visible light image by visible light and an invisible light image.

Further, the influence of reflection on an invisible light image can be reduced to prevent excessive image correction.

Furthermore, even when the image reading apparatus executes dust/scratch reduction using an image read with invisible light at a resolution lower than that of an image read with visible light, a dust/scratch position can be specified without degrading the dust/scratch reduction performance. The reading speed using invisible light can be optimized, thus increasing the speed of the dust/scratch reduction function.

If an image is read at a very high resolution in comparison with the size of dust or a scratch, the pixel unit at which images read with invisible light and visible light are processed can be decreased without degrading the dust/scratch reduction performance in order to specify a dust/scratch position on the image read with visible light. The dust/scratch position can be specified at a high speed, increasing the speed of the dust/scratch reduction function.

<Fifth Embodiment>

Figure 18:
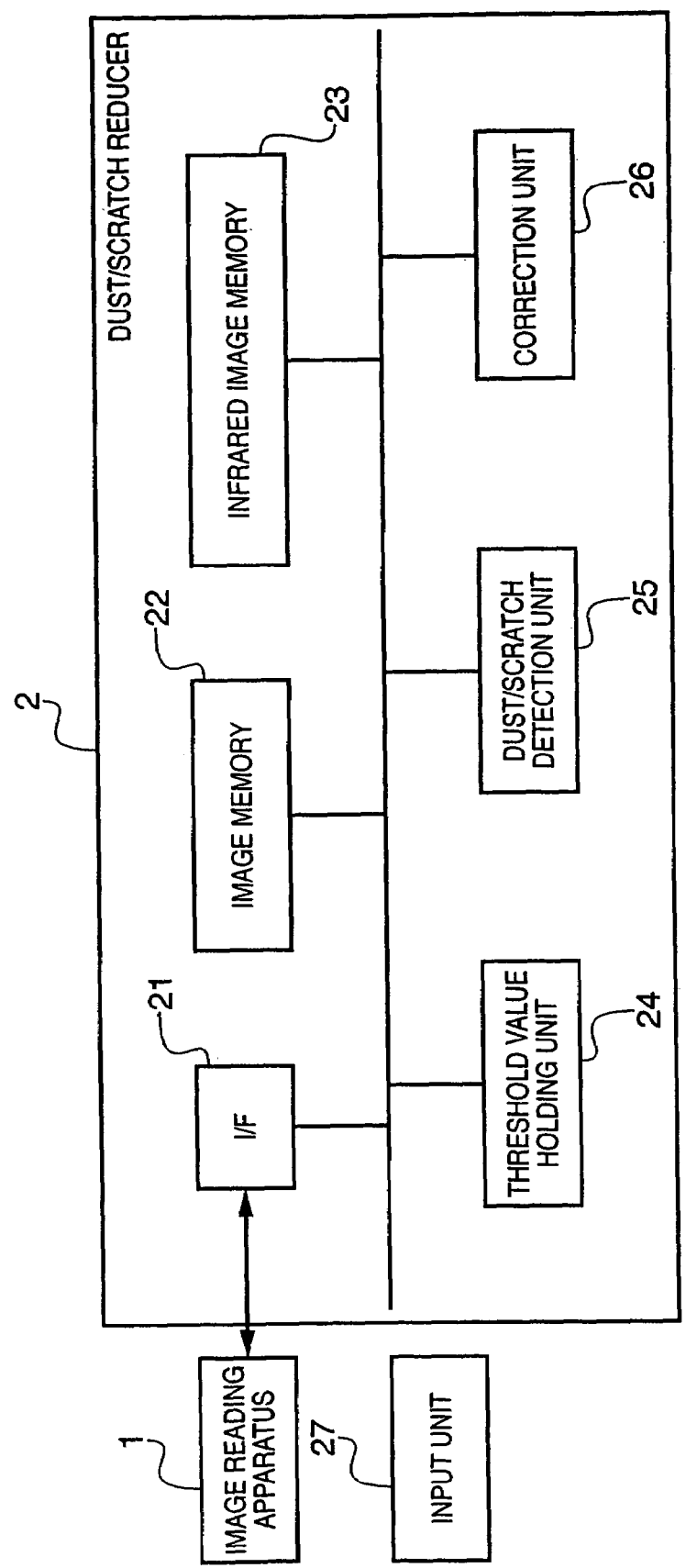
FIG. 18 is a block diagram showing the configuration of an image reading system according to a sixth embodiment of the present invention.

FIG. 18 shows the arrangement of a dust/scratch reducer 2 for processing image data obtained from an image reading apparatus 1 according to the fifth embodiment. The image reading apparatus is the same as that shown in FIG. 26, and a description thereof will be omitted. The arrangement shown in FIG. 18 includes an input unit 27 comprising an input keyboard, mouse, and display, in addition to the arrangement shown in FIG. 27. The dust/scratch reducer 2 and input unit 27 can be constituted by a computer. The fifth embodiment can be realized by driver software of the image reading apparatus that runs on a computer.

The operation of an image reading apparatus system in the fifth embodiment will be explained with reference to the flow chart of FIG. 19.

In step S401, the user inputs via the input unit 27 a desired resolution of an image to be read. If the user does not input any value, the resolution set in previous scanning is displayed to urge the user to confirm it.

Figure 20:
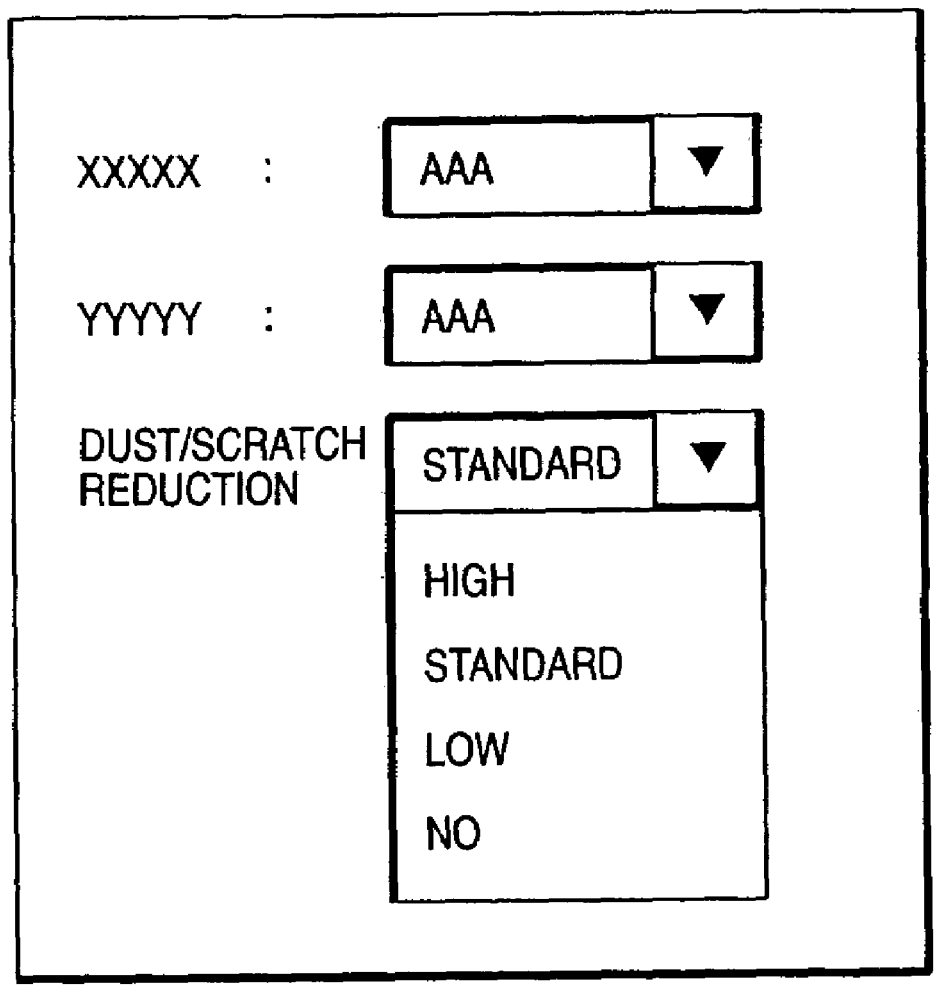
FIG. 20 is a view showing a display example of an operation unit for setting a dust/scratch correction process according to the sixth embodiment of the present invention.
Figure 21:
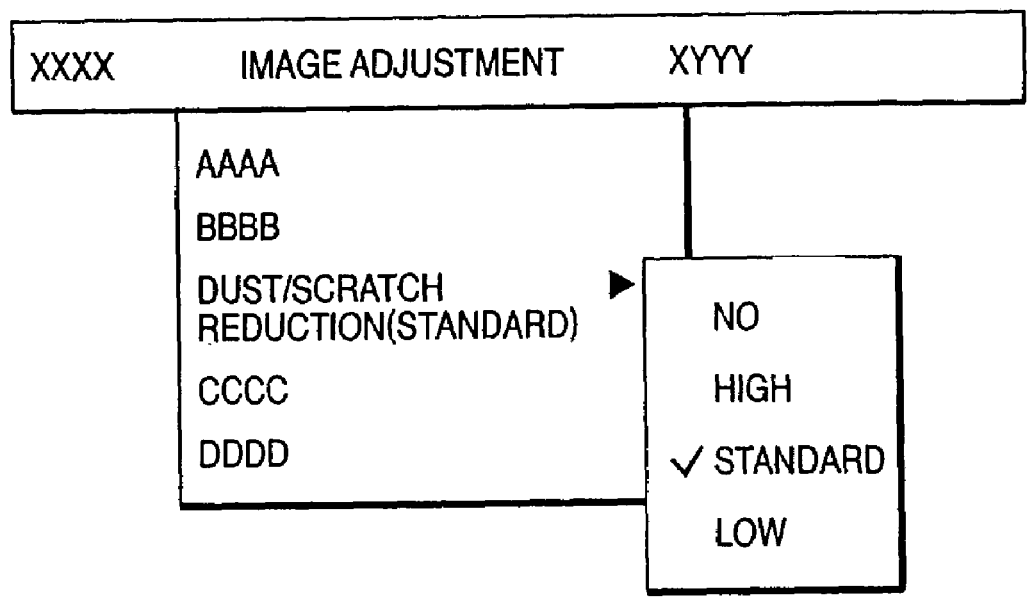
FIG. 21 is a view showing another display example of the operation unit for setting a dust/scratch correction process according to the sixth embodiment of the present invention.

In step S402, the user inputs the dust/scratch reduction sensitivity via the input unit 27. In general, an optimal dust/scratch correction result varies depending upon the type of film, the dust/scratch size, or the subjective point of a person who observes an image. Only a uniform setting of whether to perform dust/scratch reduction cannot achieve a process suitable for an individual film. The fifth embodiment prepares three dust/scratch reduction levels "high, standard, and low". Since some films do not require any dust/scratch reduction, "no" which means that no dust/scratch reduction is performed is also set to shorten the time until an image is acquired. These four levels are set via the input unit 27. FIGS. 20 and 21 show display examples on the input unit 27.

FIG. 20 is a schematic view showing part of UI (User Interface) of Windows driver software in a form of selecting from four parameters from a dialog box. FIG. 21 is a schematic view showing part of UI of Macintosh driver software in a form of setting from four parameters from a pull-down menu, a selected parameter high, standard, or low is displayed at the XX portion of dust/scratch reduction (XX).

Figure 30:
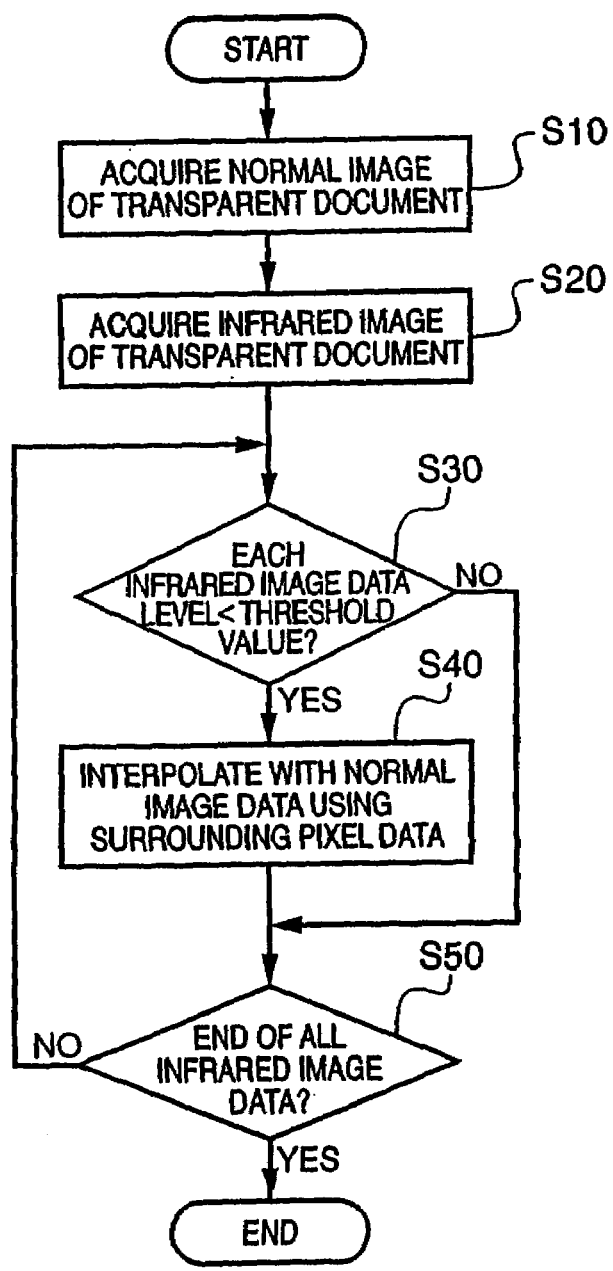
FIG. 30 is a flow chart showing a conventional process in a dust/scratch remover.

In step S403, a visible light image is read, similar to step S10 of FIG. 30.

In step S404, an infrared image is read, similar to step S20 of FIG. 30. However, if "no" is set in step S402, the flow advances to "end" to end this flow process.

In step S405, a dust/scratch position is detected from the infrared image read in step S404.

Detection of the dust/scratch position will be described with reference to FIGS. 22A to 22D. FIG. 22A shows dust 502 on a film 501. FIG. 22B shows the gray level of an image read by using a transparent document illumination lamp. FIG. 22C shows the gray level of an image read by using an infrared lamp. FIG. 22D shows the histogram of infrared image data.

L1 in FIGS. 22C and 22D represents a gray level corresponding to the average value of the frequency of an entire infrared image. The gray level of the portion of the dust 502 is lower than the gray level L1 corresponding to the average value of the frequency. The fifth embodiment pays attention to the gray level L1 corresponding to the average of the frequency of histogram data. A threshold value for detecting the dust 502 is set to a gray level L2 lower than the gray level L1 by a predetermined level ΔL1 so as to be near the maximum value of a gray level 201 where data of the dust 502 is distributed. In general, the ratio of the dust 502 occupying the entire image is small. Thus, the gray level L1 corresponding to the average value of the frequency is almost equal to the average value of a gray level on the entire image except for the portion of the dust 502. Hence, a defect region 505 detected by a threshold value 504 (gray level L2) in FIG. 22C can almost accurately detect the portion of the dust 502.

The magnitude of ΔL1 is set in accordance with the sensitivity input in step S402. For "high", ΔL1 is set small so as to detect many dust particles and scratches. For "low", ΔL1 is set large.

In step S406, a correction process is performed on a pixel or pixels of the visible light image corresponding to the dust/scratch portion detected in step S405 by interpolation using their peripheral normal pixel data.

In step S407, the visible light image having undergone the correction process is displayed on the display of the input unit 27. The user confirms the corrected state, and if he/she wants to change the sensitivity, changes the sensitivity via the input unit 27.

In a dust/scratch reduction process, such parameters as to reduce general dust and scratches in the "standard" mode are set. If a dust/scratch result is improper, the user changes the setting to "high", "low", or "no" on UI. The parameters need to be changed in the following cases.

Since a scratch portion generally has a high infrared transmittance in comparison with dust, scratches may not be fully reduced in standard settings. In this case, "high" is set on UI. At "high" parameters, the threshold value L2 used to detect dust or scratches is set high, i.e., the value ΔL1 is set small. The range of the defect region 505 where dust and scratches are detected is widened. This enables detecting even scratches whose transmittance is higher than general dust. To the contrary, if an image becomes unnatural by processing an inconspicuous dust/scratch portion, "low" is set on UI. At "low" parameters, the threshold value L2 used to detect dust or scratches is set low, i.e., the value ΔL1 is set large. The range of the defect region 505 where dust and scratches are detected is narrowed, and the correction range is also narrowed. This prevents generation of an unnatural image.

If the setting for the sensitivity is changed in step S408, processes in step S405 and subsequent steps are executed again in accordance with the changed sensitivity.

<Sixth Embodiment>

The sixth embodiment will be described.

In the fifth embodiment, the threshold value used to detect a dust/scratch region from an infrared image is set in accordance with a set dust/scratch reduction sensitivity. The sixth embodiment executes an enlargement process of enlarging a dust/scratch region detected by the threshold value in accordance with a set sensitivity. The operation except for step S406 in FIG. 19 is the same as that in the fifth embodiment, and a description thereof will be omitted. The dust/scratch region enlargement process in step S406 in the sixth embodiment will be explained.

Figure 23:
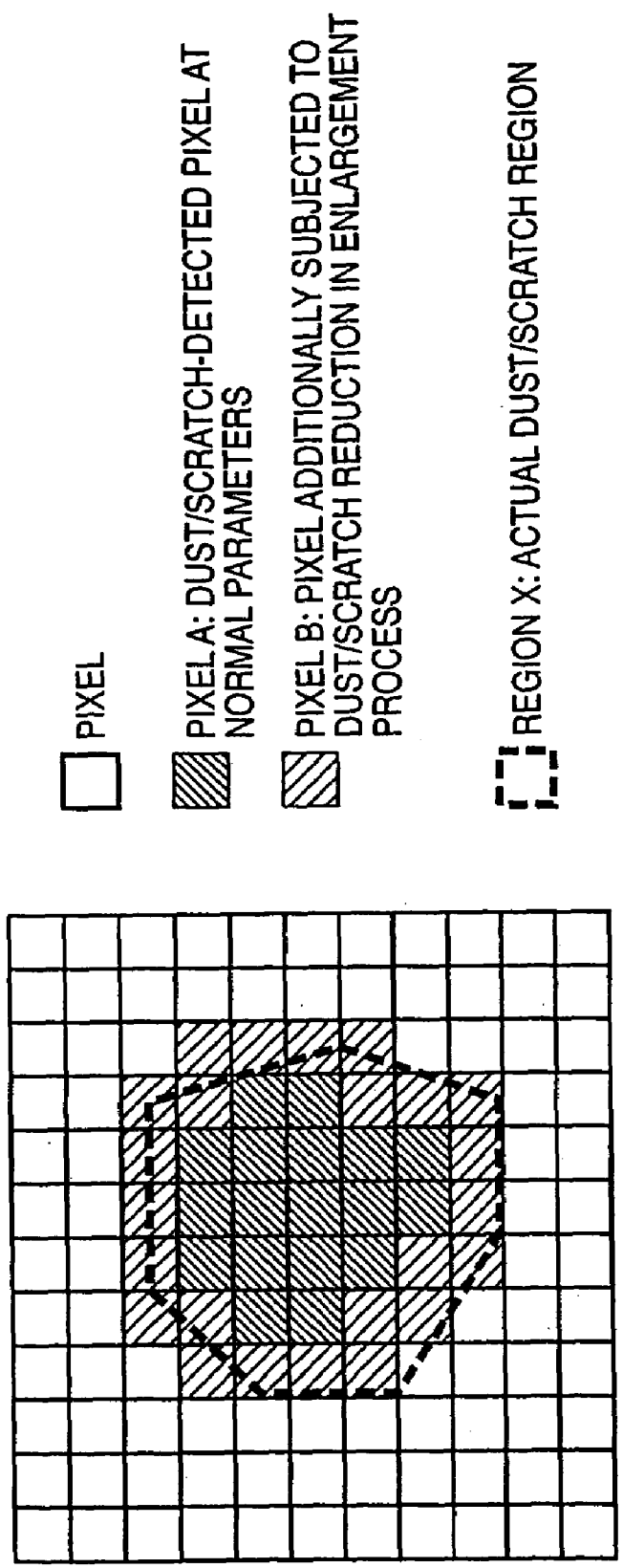
FIG. 23 is a view for explaining an enlargement process according to a seventh embodiment of the present invention.
Figure 25:
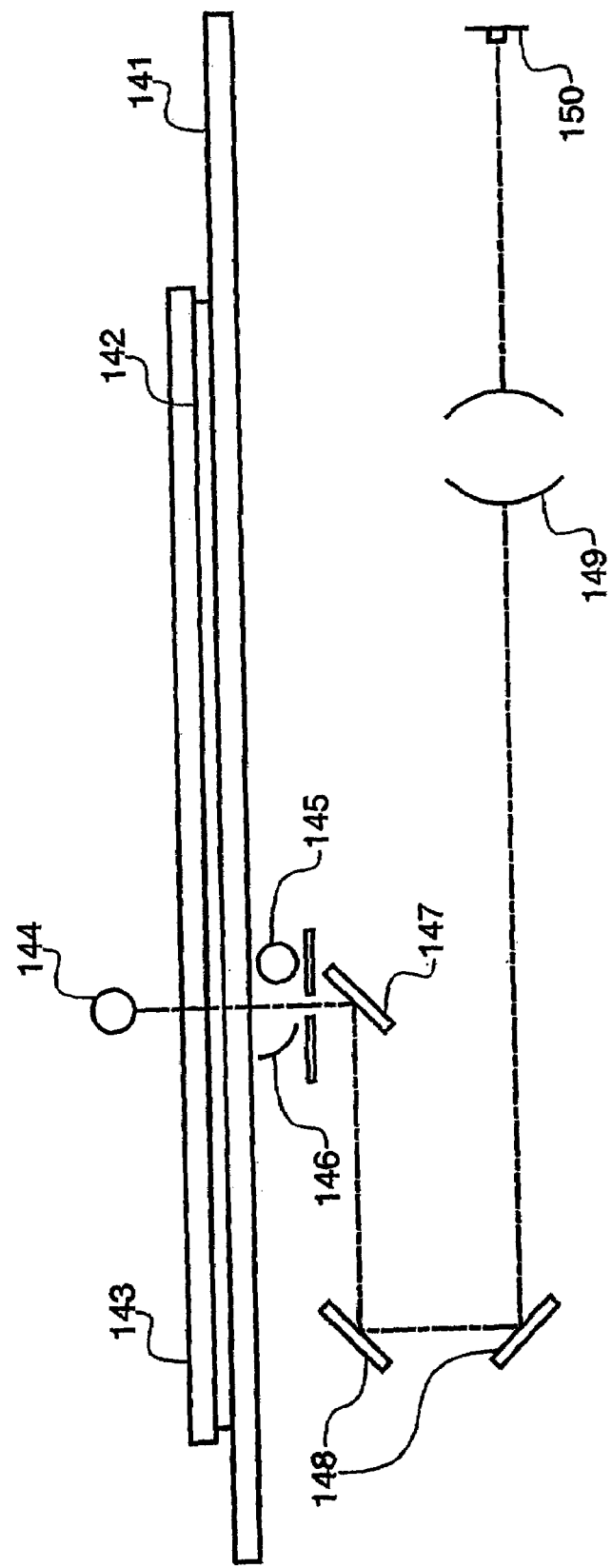
FIG. 25 is a schematic view showing the arrangement of a conventional image reading apparatus.

FIG. 23 schematically shows an enlargement process method. A pixel A denotes a pixel detected as a dust/scratch region using normal parameters. When a dust/scratch region X is not actually detected but is larger than the region of pixels A, effects of dust or a scratch around the pixels A will not be retouched and remains. In this case, the region to undergone dust/scratch reduction is enlarged to include pixels B around the region of pixels A. The enlarged region undergoes dust/scratch reduction, and the actual dust/scratch region X can be processed.

In the case of FIG. 23, the detected region of pixels A is enlarged by one neighboring pixel in every direction and subjected to a dust/scratch reduction process. If the portion around dust or a scratch cannot be completely processed, "high" is set on UI to widen a region which undergoes the dust/scratch reduction by adding some more neighboring pixels in every direction to the region of pixels A. Then, the region including the neighboring pixels can also undergo the dust/scratch reduction. To the contrary, an image may look unnatural owing to a dust/scratch process performed for an inconspicuous dust/scratch portion of a visible light image. In this case, "low" is set on UI to narrow a region detected by the dust/scratch detection process. Accordingly, the size of the region which undergoes dust/scratch reduction is reduced, which will make a resultant image more natural.

<Seventh Embodiment>

The seventh embodiment will be described.

In the sixth embodiment, the enlargement amount of a region after a dust/scratch region is detected from an infrared image is set in accordance with a set dust/scratch reduction sensitivity. In the seventh embodiment, a range where interpolation pixel data is searched for when dust/scratch reduction is executed by interpolation using image data of normal pixels around pixels to be corrected is set in accordance with a set dust/scratch reduction sensitivity.

Figure 19:
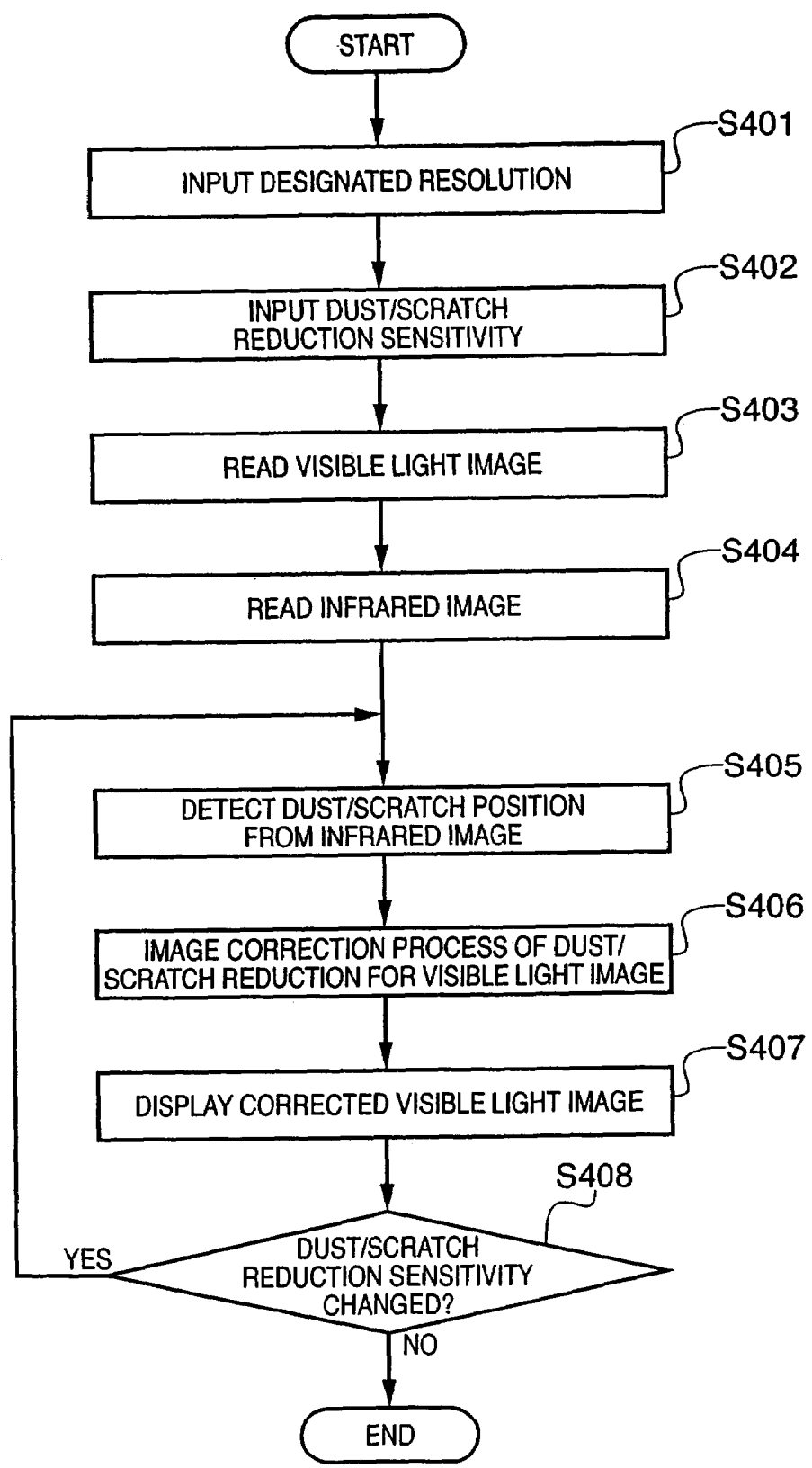
FIG. 19 is a flow chart showing a process according to the sixth embodiment of the present invention.

The operation other than step S406 in FIG. 19 is the same as that in the fifth embodiment, and a description thereof will be omitted. An interpolation process in step S406 in the seventh embodiment will be explained.

FIGS. 24A and 24B schematically show a pattern interpolation method. A region C is a defect region detected as a dust/scratch region. A region Y as a pattern interpolation data range which can include the region C is detected from the neighboring area of the region C. The region C is interpolated by the pattern of the region Y. A region Z is a range interpolated by applying pattern interpolation. This pattern interpolation uses as a parameter a maximum interpolation length for searching for a pixel apart from a defect region by a given distance as an interpolation pattern candidate. This maximum interpolation length is a parameter for changing the degree of the dust/scratch reduction effect by changing the length to a short one for "low" or a long one for "high".

In FIGS. 24A and 24b, the interpolation length is three pixels. In determining a direction in which a pixel pattern used to interpolate a defect region by pattern interpolation is searched for, the longitudinal and transverse lengths of the defect region are checked, and a shorter direction is adopted. In the example shown in FIG. 24A, the longitudinal direction x of the region is shorter than the transverse direction y. Thus, an interpolation pattern is searched for first in the transverse direction. If no pattern is found after the range of the maximum interpolation length in the transverse direction is checked, an interpolation pattern is searched for also in the longitudinal direction. In pattern interpolation, the gray level difference between respective colors regarded as the same pattern is separately designated. If the gray level difference regarded as the same pattern is set large, the pattern interpolation data region Y can be more easily found, but the image may become unnatural. If the gray level difference regarded as the same pattern is set small, the interpolation data region Y is difficult to search for.

<Eighth Embodiment>

The above embodiments execute processes by determining the number of pixels subjected to an enlargement process or the maximum interpolation length of pattern interpolation as the above-described parameter in the three settings "high, standard, and low". However, uniformly determining the number of pixels cannot achieve an optimal process because the number of pixels corresponding to dust or a scratch changes depending on the resolution though the size of the dust or scratch remains unchanged. To prevent this, the parameter is set in accordance with the resolution, which provides almost the same dust/scratch reduction effect regardless of the resolution.

A dust/scratch reduction parameter is set based on information about the resolution of an image input in step S401 of FIG. 19. Table 1 shows an example of the number of pixels as a correction parameter set in accordance with the resolution and the dust/scratch reduction sensitivity.

TABLE 1

| Resolution (dpi) | Number of Enlargement Pixels | | | Maximum Pattern Interpolation Count | | |
|---|---|---|---|---|---|---|
| | Low | Standard | High | Low | Standard | High |
| 1200 | 0 | 1 | 2 | 6 | 8 | 10 |
| 2400 | 1 | 2 | 3 | 12 | 16 | 20 |
| 4800 | 2 | 4 | 6 | 24 | 32 | 40 |

<Modification>

The eighth embodiment shows the table of the number of enlargement pixels and the maximum pattern interpolation count in accordance with the resolution. Alternatively, the dust/scratch detection threshold value can be changed. The gray level difference of an interpolation pattern color described in the seventh embodiment may be set to "large, medium, and small" in accordance with the dust/scratch reduction sensitivity "high, standard, and low".

In the fifth to eighth embodiments, "high, standard, and low" are set as dust/scratch reduction sensitivities. Alternatively, respective parameters may be directly set by numerical values such as the number of pixels, or set by percentage representation with respect to a standard value.

The present invention has exemplified a transparent document, but can also be applied to a reflecting document. The present invention has exemplified infrared light as invisible light as embodiments, but may use ultraviolet light depending on the feature of a document.

As has been described above, the present invention can realize appropriate dust/scratch reduction corresponding to the feature of a document in an image signal processing apparatus, image signal processing method, and image signal reading system for a document.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. A control method for an image reading apparatus having a visible light source that emits visible light, an invisible light source that emits invisible light, an imaging optical system adapted to irradiate a document by these light sources to form optical images of the document, and a photoelectric converter adapted to photoelectrically convert the optical images of the document, comprising:
turning on the visible light source and acquiring a visible light image signal by the photoelectric converter;
turning off the visible light source after the visible light image is acquired and turning on the invisible light source to acquire an invisible light image signal by the photoelectric converter;
turning off the invisible light source after the invisible light image signal is acquired and turning on the visible light source so as to wait for operation for acquiring the next visible light image signal;
detecting a dust/scratch portion of the document from the invisible light image signal; and
reducing a dust/scratch portion of the visible light image signal on the basis of the detected dust/scratch portion.

2. The method according to claim 1, wherein the image reading apparatus has an optical path length correction member adapted to correct a difference in imaging position between visible and invisible light images, and
the method further comprises
inserting the optical path length correction member into an optical axis of the imaging optical
system in order to acquire the visible light image signal, and retracting the optical path length correction member from the optical axis of the
imaging optical system in order to acquire the invisible light image signal.

3. The method according to claim 2, wherein the invisible light includes infrared light.

4. The method according to claim 1, wherein the image reading apparatus has an optical path length correction member adapted to correct a difference in imaging position between visible and invisible light images, and
the method further comprises
inserting the optical path length correction member into an optical axis of the imaging optical system in order to acquire the invisible light image signal, and
retracting the optical path length correction member from the optical axis of the imaging optical system in order to acquire the visible light image signal.

5. The method according to claim 4, wherein the invisible light includes ultraviolet light.

6. The method according to claim 1, wherein the visible light source includes a cold cathode fluorescent lamp.

7. The method according to claim 1, wherein the visible light source requires a relatively long rise time compared to the invisible light source.

8. An image reading apparatus having a visible light source that emits visible light, an invisible light source that emits invisible light, an imaging optical system for irradiating a document by these light sources to form optical images of the document, and a photoelectric converter for photoelectrically converting the optical images of the document, comprising:
a controller adapted to turn on the visible light source acquire a visible light image signal by said photoelectric converter, turn off the visible light source after the visible light image is acquired, then turn on the invisible light source and acquire an invisible light image signal by said photoelectric converter, turn off the invisible light source, turn on the visible light source so as to wait for operation for acquiring the next visible light image signal, then detect a dust/scratch portion of the document from the invisible light image signal, and reduce a dust/scratch portion of the visible light image signal on the basis of the detected dust/scratch portion.

9. The apparatus according to claim 8, further comprising:
an optical path length correction member adapted to correct a difference in imaging position between a visible light image obtained by the photoelectric converter by turning on the visible light source and an invisible light image obtained by the photoelectric converter by turning on the invisible light source; and
a driver adapted to insert said optical path length correction member into an optical axis of the imaging optical system and retract said optical path length correction member from the optical axis.

10. The apparatus according to claim 8, further comprising a magnification correction unit that makes image magnifications of the visible and invisible light images coincide with each other.

11. The apparatus according to claim 8, further comprising a positional shift correction unit that corrects a positional shift between the visible and invisible light images.

12. The apparatus according to 8, further comprising an adder/subtracter adapted to add/subtract the visible light image signal to/from the invisible light image signal at a predetermined ratio.

13. The apparatus according to claim 12, further comprising a dust/scratch detector adapted to detect dust and scratch on the document from an output image signal from said adder/subtracter.

14. The apparatus according to claim 13, further comprising a dust/scratch reducer adapted to reduce a dust/scratch portion of the visible light image signal on the basis of a dust/scratch portion detected by said dust/scratch detector.

15. The apparatus according to claim 12, wherein the visible light source includes a cold cathode fluorescent lamp.

16. The apparatus according to claim 12, wherein the visible light source requires a relatively long rise time compared to the invisible light source.

17. A computer program product comprising a computer usable medium having computer readable program code means embodied in said medium for carrying out the image processing method of irradiating a document by a visible light source that emits visible light and an invisible light source that emits invisible light, and processing visible and invisible light image signals obtained by photoelectrically converting optical images of the document, said product including:

first computer readable program code means for turning on the visible light source and acquiring a visible light image signal by a photoelectric converter;

second computer readable program code means for turning off the visible light source after the visible light image is acquired, and turning on the invisible light source and acquiring an invisible light image signal by the photoelectric converter;

third computer readable program code means for turning off the invisible light source after the invisible light image signal is acquired, and turning on the visible light source so as to wait for operation for acquiring the next visible light image signal;

fourth computer readable program code means for detecting a dust/scratch portion of the document from the invisible light image signal; and fifth computer readable program code means reducing a dust/scratch portion of the visible light image signal on the basis of the detected dust/scratch portion.

* * * * *

UNITED STATES PATENT AND TRADEMARK OFFICE
CERTIFICATE OF CORRECTION

PATENT NO. : 7,245,784 B2  Page 1 of 1
APPLICATION NO. : 11/197709
DATED : July 17, 2007
INVENTOR(S) : Tsutomu Takayama et al.

It is certified that error appears in the above-identified patent and that said Letters Patent is hereby corrected as shown below:

Column 12, Line 48, change "US2002-000480 1AP" to --US2002-0004801 A--.

Column 26, Line 30, delete "then".

Column 26, Line 65, change "12" to --8--.

Column 27, Line 1, change "12" to --8--.

Signed and Sealed this

First Day of January, 2008

JON W. DUDAS
*Director of the United States Patent and Trademark Office*